United States Patent
Kasuya et al.

(10) Patent No.: US 10,105,640 B2
(45) Date of Patent: Oct. 23, 2018

(54) GAS SEPARATION COMPOSITE AND METHOD OF PRODUCING SAME

(71) Applicant: FUJIFILM Corporation, Tokyo (JP)

(72) Inventors: Yuichi Kasuya, Haibara-gun (JP); Hisashi Hotta, Haibara-gun (JP); Takayasu Nagai, Haibara-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 154 days.

(21) Appl. No.: 15/280,331

(22) Filed: Sep. 29, 2016

(65) Prior Publication Data

US 2017/0014754 A1    Jan. 19, 2017

Related U.S. Application Data

(63) Continuation of application No. PCT/JP2015/057345, filed on Mar. 12, 2015.

(30) Foreign Application Priority Data

Mar. 31, 2014    (JP) .................................. 2014-073176

(51) Int. Cl.
*B01D 53/22* (2006.01)
*B01D 69/02* (2006.01)
(Continued)

(52) U.S. Cl.
CPC ......... *B01D 53/228* (2013.01); *B01D 63/066* (2013.01); *B01D 67/0079* (2013.01);
(Continued)

(58) Field of Classification Search
CPC ............ B01D 2325/04; B01D 2325/06; B01D 2239/0478; B01D 67/0079; B01D 53/228;
(Continued)

(56) References Cited

U.S. PATENT DOCUMENTS 3,565,981 A * 2/1971 Lauro ................... C08J 9/28
264/284
3,721,596 A * 3/1973 Drake .................... B01D 69/10
156/178

(Continued)

FOREIGN PATENT DOCUMENTS

EP    0224444 A1    6/1987
EP    0388354 A1    9/1990

(Continued)

OTHER PUBLICATIONS

Communication dated Feb. 23, 2018 from the European Patent Office in counterpart European application No. 15772812.2.

(Continued)

*Primary Examiner* — Anthony R Shumate
(74) *Attorney, Agent, or Firm* — Sughrue Mion, PLLC

(57) ABSTRACT

The present invention provides a gas separation composite which has high heat resistance and mechanical strength, prevents a support layer from being deformed or damaged by heat during formation of a gas separation membrane and heat during a gas separation operation, and properly supports a gas separation layer to obtain high gas permeability and gas separation properties; and a method of producing the gas separation composite. The gas separation composite includes a metal support having a plurality of through holes in the thickness direction and a gas separation layer laminated on the surface of the metal support. The thickness of the gas separation layer is in a range of 0.1 to 5 μm, the average opening diameter of the through holes of the metal support is in a range of 0.1 to 30 μm, and the opening ratio thereof is in a range of 0.05% to 10%.

20 Claims, 7 Drawing Sheets

(51) Int. Cl.
| | |
|---|---|
| *B01D 69/10* | (2006.01) |
| *B01D 69/12* | (2006.01) |
| *B01D 71/64* | (2006.01) |
| *B01D 63/06* | (2006.01) |
| *B01D 67/00* | (2006.01) |
| *B01D 71/02* | (2006.01) |

(52) U.S. Cl.
CPC ......... *B01D 67/0083* (2013.01); *B01D 69/02* (2013.01); *B01D 69/10* (2013.01); *B01D 69/105* (2013.01); *B01D 69/12* (2013.01); *B01D 71/64* (2013.01); *B01D 71/022* (2013.01); *B01D 2239/0478* (2013.01); *B01D 2325/02* (2013.01); *B01D 2325/04* (2013.01); *B01D 2325/06* (2013.01); *B01D 2325/30* (2013.01)

(58) Field of Classification Search
CPC .... B01D 71/022; B01D 71/64; B01D 63/066; B01D 67/0083; B01D 69/12; B01D 2325/02; B01D 2325/30; B01D 69/10; B01D 69/105; B01D 69/02
See application file for complete search history.

(56) References Cited

U.S. PATENT DOCUMENTS

| | | | | |
|---|---|---|---|---|
| 4,722,771 | A | 2/1988 | Textor et al. | |
| 4,980,069 | A * | 12/1990 | Gauger | B01D 67/0088 |
| | | | | 210/490 |
| 5,240,862 | A * | 8/1993 | Koenhen | B01L 3/5023 |
| | | | | 210/500.24 |
| 2002/0028345 | A1* | 3/2002 | Kempf | B01D 53/228 |
| | | | | 428/670 |
| 2002/0056371 | A1* | 5/2002 | Hayes | B01D 53/228 |
| | | | | 96/11 |
| 2006/0090649 | A1* | 5/2006 | Liu | B01D 53/22 |
| | | | | 96/4 |
| 2006/0090651 | A1* | 5/2006 | Liu | B01D 46/0021 |
| | | | | 96/121 |
| 2007/0190302 | A1 | 8/2007 | Maeda et al. | |
| 2010/0132932 | A1* | 6/2010 | Kluge | C04B 37/021 |
| | | | | 165/185 |
| 2010/0226823 | A1* | 9/2010 | Rakhman | B01D 53/268 |
| | | | | 422/84 |
| 2010/0300960 | A1* | 12/2010 | Hishiki | B01D 63/066 |
| | | | | 210/490 |
| 2014/0352534 | A1 | 12/2014 | Sano et al. | |
| 2016/0304369 | A1* | 10/2016 | Xin | C02F 3/085 |

FOREIGN PATENT DOCUMENTS

| | | |
|---|---|---|
| EP | 0674937 A2 | 10/1995 |
| JP | 2013-169485 A | 9/2013 |
| JP | 2014054631 A | 3/2014 |
| WO | 2004/085034 A2 | 10/2004 |

OTHER PUBLICATIONS

International Preliminary Report on Patentability and Written Opinion, dated Oct. 13, 2016, in International Application No. PCT/JP2015/057345, 5 pages in English.
International Search Report for PCT/JP2015/057345 dated Apr. 21, 2015 [PCT/ISA/210].
Written Opinion for PCT/JP2015/057345 dated Apr. 21, 2015 [PCT/ISA/237].
Communication dated Mar. 10, 2017, issued from the European Patent Office in counterpart Application No. 15772812.2.
Nistor, et al., "Composite Membranes with Cross-Linked Matrimid Selective Layer for Gas Separation," Environmental Engineering and Management Journal, Nov./Dec. 2008, vol. 7, No. 6, pp. 653-659 (7 pages total).

* cited by examiner

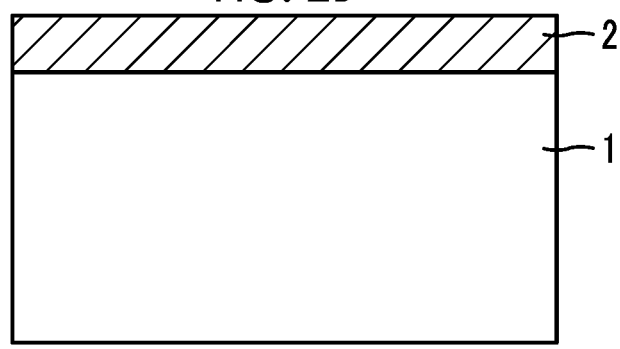
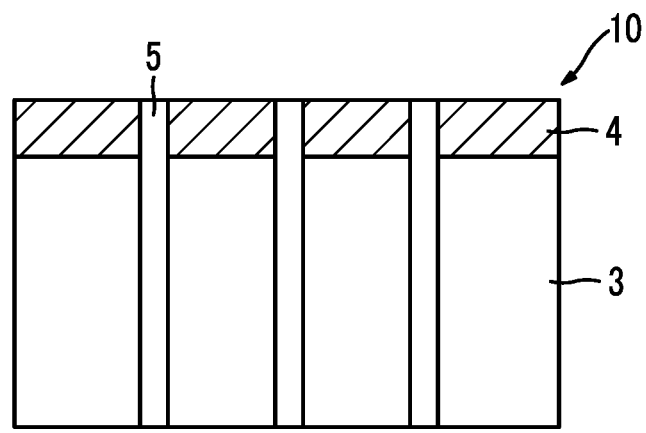

GAS SEPARATION COMPOSITE AND METHOD OF PRODUCING SAME

CROSS-REFERENCE TO RELATED APPLICATIONS

This application is a Continuation of PCT International Application No. PCT/JP2015/057345 filed on Mar. 12, 2015, which claims priority under 35 U.S.C. § 119(a) to Japanese Patent Application No. 2014-073176 filed on Mar. 31, 2014. The above application is hereby expressly incorporated by reference, in its entirety, into the present application.

BACKGROUND OF THE INVENTION

1. Field of the Invention

The present invention relates to a gas separation composite and a method of producing the same.

2. Description of the Related Art

A material formed of a polymer compound has a gas permeability specific to the material. Based on this property, it is possible to cause selective permeation and separation out of a target gas component using a membrane formed of a specific polymer compound. As an industrial application for this gas separation membrane related to the problem of global warming, separation and recovery from large-scale carbon dioxide sources using this gas separation membrane has been examined in thermal power plants, cement plants, or ironworks blast furnaces. Further, this membrane separation technique has been attracting attention as a means for solving environmental issues which can be performed with relatively little energy. In addition, natural gas or biogas (gas generated due to fermentation or anaerobic digestion of, for example, biological excrement, organic fertilizers, biodegradable substances, sewage, garbage, or energy crops) is a mixed gas mainly containing methane and carbon dioxide, and a membrane separation method is being examined as a means for removing impurity components such as the carbon dioxide and the like therefrom.

In order to ensure practical gas permeability, such a gas separation membrane needs to be thin. However, in a case where the gas separation membrane is thin, since the mechanical strength of the gas separation membrane is decreased, this may result in generation of defects and deterioration of gas separation performance. Therefore, for the purpose of securing the gas permeability, gas separation performance, and mechanical strength, a gas separation membrane is formed on a support layer having gas permeability to obtain a composite membrane.

For example, JP2013-169485A describes that a porous support is used as a support layer and also describes various resins such as a polyolefin resin and a fluorine-containing resin as a material of the support layer (Claim 1 and [0022]). Further, JP2013-169485A describes that the support layer may include a support formed of woven fabric, non-woven fabric, or a net in order to provide mechanical strength for the support layer and also describes various resins such as polyester as the material thereof ([0024]).

SUMMARY OF THE INVENTION

Meanwhile, when a composite membrane obtained by forming a gas separation membrane on a support layer is prepared, a process of heating may accompany a process of drying and/or curing a coating composition, which becomes the gas separation membrane, after being applied to the support layer.

Moreover, when a gas separation operation is performed using the composite membrane having such a gas separation membrane, high-temperature raw material gas (mixed gas) is supplied at a high pressure.

However, since the heat resistance of a support layer formed of an organic material such as a resin may not be sufficient, in a composite membrane using a support layer formed of an organic material such as a resin, there is a problem in that the support layer may be deformed or damaged by heat during formation of a gas separation membrane and heat during a gas separation operation so that the gas separation membrane cannot be properly supported by the support layer and, accordingly, the gas separation performance is degraded.

An object of the present invention is to provide a gas separation composite which has high heat resistance and mechanical strength, prevents a support layer from being deformed or damaged by heat during formation of a gas separation membrane and heat during a gas separation operation, and properly supports a gas separation layer to obtain excellent gas permeability and gas separation properties; and a method of producing the gas separation composite.

As a result of intensive research conducted by the present inventor in order to achieve the above-described object, it was found that a gas separation composite which has high heat resistance and mechanical strength, prevents a support layer from being deformed or damaged by heat, and properly supports a gas separation layer to obtain high gas permeability and gas separation properties can be obtained by forming a gas separation layer having a predetermined thickness on a metal support that includes through holes having a predetermined average opening diameter and a predetermined opening ratio, thereby completing the present invention.

That is, it was found that the above-described object can be achieved using the following configurations.

[1] A gas separation composite comprising: a metal support which has a plurality of through holes in a thickness direction; and a gas separation layer which is laminated on a surface of the metal support, in which a thickness of the gas separation layer is in a range of 0.1 to 5 µm, an average opening diameter of the through holes of the metal support is in a range of 0.1 to 30 µm, and an opening ratio thereof is in a range of 0.05% to 10%.

[2] The gas separation composite according to [1], in which the metal support is an aluminum substrate.

[3] The gas separation composite according to [1] or [2], in which the material of the gas separation layer is insoluble polyimide.

[4] The gas separation composite according to any one of [1] to [3], in which a ratio X/T of an average opening diameter X of the through holes to a thickness T of the gas separation layer is in a range of 0.02 to 100.

[5] The gas separation composite according to any one of [1] to [4], in which a surface area ratio ΔS at the interface between the metal support and the gas separation layer is in a range of 20% to 80%.

[6] The gas separation composite according to any one of [1] to [5], in which the thickness of the metal support is in a range of 5 to 100 µm.

[7] A method of producing a gas separation composite comprising: a preparing process of preparing a metal support which has a plurality of through holes in the thickness direction and in which the average opening diameter of the through holes is in a range of 0.1 to 30 μm and the opening ratio thereof is in a range of 0.05% to 10%; a coating process of coating the surface of the metal support with a coating composition which becomes a gas separation layer; and a separation layer forming process of curing the coating composition applied to the surface of the metal support to form the gas separation layer having a thickness of 0.1 to 5 μm.

[8] The method of producing a gas separation composite according to [7], in which the gas separation layer is insoluble polyimide, and the separation layer forming process includes a process of heating the applied coating composition at 200° C. or higher for insolubilization.

[9] The method of producing a gas separation composite according to [7] or [8], in which the metal support is an aluminum substrate, and the preparing process includes an oxide film forming process of performing an oxide film forming treatment on the surface of the aluminum substrate to form an oxide film, and a through hole forming process of performing an electrochemical dissolution treatment after the oxide film forming process to form the through holes.

[10] The method of producing a gas separation composite according to [9], in which the preparing process further includes an oxide film removing process of removing the oxide film after the through hole forming process.

[11] The method of producing a gas separation composite according to [9] or [10], in which the preparing process further includes a metal covering process of covering at least a part or the entire surface of the aluminum substrate including the inner surfaces of the through holes with a metal other than aluminum after the through hole forming process.

[12] The method of producing a gas separation composite according to any one of [7] to [11], further comprising: a roughening process of roughening a surface of the metal support side on which the gas separation layer is formed and setting a surface area ratio ΔS thereof to be in a range of 20% to 80% after the preparing process and before the coating process.

As described below, according to the present invention, it is possible to provide a gas separation composite which has high heat resistance and mechanical strength, prevents a support layer from being deformed or damaged by heat during formation of a gas separation membrane and heat during a gas separation operation, and properly supports a gas separation layer to obtain high gas permeability and gas separation properties; and a method of producing the gas separation composite.

BRIEF DESCRIPTION OF THE DRAWINGS

FIGS. 2A to 2E are sectional views schematically illustrating an example of a method of producing a metal support according to a preferred embodiment of the present invention. FIG. 2A is a sectional view schematically illustrating an aluminum substrate; FIG. 2B is a sectional view schematically illustrating a state of an oxide film being formed by performing an oxide film forming treatment on the aluminum substrate; FIG. 2C is a sectional view schematically illustrating a state of through holes being formed on the aluminum substrate and the oxide film by performing an electrochemical dissolution treatment after the oxide film forming treatment; FIG. 2D is a sectional view schematically illustrating a state of the substrate from which the oxide film is removed after the electrochemical dissolution treatment is carried out; and FIG. 2E is a sectional view schematically illustrating a state of the substrate to which an electrochemical roughening treatment is further applied after the oxide film is removed.

FIG. 3A is a sectional view schematically illustrating an aluminum substrate; FIG. 3B is a sectional view schematically illustrating a state of an oxide film being formed on the surface and the rear surface of the aluminum substrate by performing an oxide film forming treatment on the aluminum substrate; FIG. 3C is a sectional view schematically illustrating a state of through holes being formed on the aluminum substrate and the oxide film by performing an electrochemical dissolution treatment after the oxide film forming treatment; FIG. 3D is a sectional view schematically illustrating a state of the substrate from which the oxide film is removed after the electrochemical dissolution treatment is carried out; and FIG. 3E is a sectional view schematically illustrating a state of the substrate to which an electrochemical roughening treatment is further applied after the oxide film is removed.

FIG. 4A is a sectional view schematically illustrating a state in which inner walls of the through holes of the aluminum substrate illustrated in FIG. 3C are covered with a metal other than aluminum and FIG. 4B is a sectional view schematically illustrating a state in which inner walls of the through holes of the aluminum substrate illustrated in FIG. 2D or 3D are covered with a metal other than aluminum.

DESCRIPTION OF THE PREFERRED EMBODIMENTS

Hereinafter, the present invention will be described in detail.

The description of constituent elements will be made based on typical embodiments of the present invention, but the present invention is not limited to such embodiments.

In the present specification, the numerical ranges shown using "to" indicate ranges including the numerical values described before and after "to" as the lower limits and the upper limits.

[Gas Separation Composite]

A gas separation composite of the present invention includes a metal support having a plurality of through holes in the thickness direction and a gas separation layer laminated on the surface of the metal support. The thickness of the gas separation layer is in a range of 0.1 to 5 μm, the average opening diameter of the through holes formed in the metal support is in a range of 0.1 to 30 μm, and the opening ratio thereof is in a range of 0.05% to 10%.

Next, the configuration of the gas separation composite of the present invention will be described with reference to FIG. 1.

Figure 1:
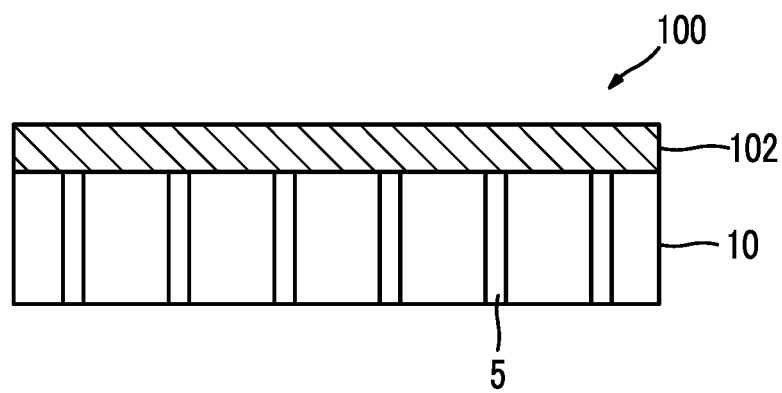
FIG. 1 is a sectional view schematically illustrating an example of a gas separation composite according to a preferred embodiment of the present invention.

FIG. 1 is a sectional view schematically illustrating an example of a gas separation composite according to a preferred embodiment of the present invention.

As illustrated in FIG. 1, a gas separation composite 100 includes a metal support 10 which includes a plurality of through holes 5 formed to have a predetermined opening ratio and an opening diameter; and a gas separation layer 102 formed on the metal support 10.

[Metal Support]

The metal support 10 is a member which supports the gas separation layer 102 and has one main surface laminated by the gas separation layer 102. Further, the metal support 10 has a plurality of through holes 5 penetrating therethrough in the thickness direction. The through holes 5 are passages for passing gas (gas having permeated through the gas separation layer 102), separated by the gas separation layer 102, through the surface side on the opposite side of the gas separation layer 102.

The average opening diameter of the through holes 5 is in a range of 0.1 μm to 30 μm.

When the average opening diameter of the through holes 5 is set to be 0.1 μm or greater, it is possible to prevent suppression of the flow of gas separated by the gas separation layer 102. Further, when the average opening diameter of the through holes 5 is set to be 5 μm or less, it is possible to prevent a coating composition which becomes the gas separation layer 102 from entering the through holes 5 at the time of formation of the gas separation layer 102 and to properly form the gas separation layer 102.

Specifically, when the average opening diameter of the through holes 5 is set to be 30 μm or less, it is possible to prevent generation of a defect caused by the gas separation layer 102 which is not formed at positions of the through holes 5 due to leakage of the coating composition in the through holes 5 and to ensure proper gas separation properties. Alternatively, it is possible to prevent an increase in film thickness due to the gas separation layer being formed in the through holes 5 resulting from entrance of the coating composition into the through holes 5 and to ensure proper gas permeability.

Moreover, when the average opening diameter of the through holes 5 is set to 30 μm or less, it is possible to prevent the gas separation layer 102 from being broken (cracked) when pressurized during the gas separation operation or the like.

From the viewpoints described above, the average opening diameter of the through holes 5 is preferably in a range of 0.1 μm to 10 μm and more preferably in a range of 0.1 μm to 5 μm.

The opening ratio of the through holes 5 on the main surface of the metal support 10 is in a range of 0.05% to 10%.

When the opening ratio thereof is less than 0.05%, there is a concern that the flow of gas separated by the gas separation layer 102 is suppressed. Further, when the opening ratio thereof is greater than 10%, this may lead to a degradation of mechanical strength of the metal support 10 and thus the metal support 10 is broken (cracked) at the time of being pressurized or being handled.

From the viewpoints described above, the opening ratio of the through holes 5 is preferably in a range of 0.05% to 5%.

Here, the average opening diameter of the through holes is acquired by imaging the surface of the metal support from right above at a magnification of 200 using a high-resolution scanning electron microscope (SEM), extracting at least 20 pits (irregularities) having a medium wave structure, in which the surroundings are continued in a circular form, in the obtained SEM photograph, reading the diameters to obtain opening diameters thereof, and then calculating the average value of the opening diameters to obtain the average opening diameter.

Further, the opening ratio of the through holes is acquired by imaging the surface of the metal support from right above at a magnification of 200 using a high-resolution scanning electron microscope (SEM), binarizing the visual fields (five sites) at a size of 30 mm×30 mm in the obtained SEM photograph using image analysis software, observing through hole portions and non-through hole portions, obtaining a ratio (opening area/geometric area) from the total opening area of through holes and the area of visual fields (geometric area), and calculating the average value of respective visual fields (five portions), thereby obtaining an opening ratio.

Moreover, the ratio (X/T) of the average opening diameter (X) of the through holes 5 to the thickness (T) of the gas separation layer 102 is preferably in a range of 0.02 to 100 and more preferably in a range of 0.02 to 50. When the ratio (X/T) thereof is in the above-described range, the gas separation layer 102 having a proper thickness, which does not have a defect or a thick film portion, can be formed on the metal support 10 including the through holes 5.

The thickness of the metal support 10 is preferably in a range of 5 μm to 100 μm, more preferably in a range of 5 μm to 50 μm, and particularly preferably in a range of 5 μm to 20 μm.

When the thickness of the metal support 10 is less than 5 μm, since the mechanical strength becomes insufficient so that wrinkles or defects are easily generated, the metal support 10 may not properly support the gas separation layer 102. Moreover, when the thickness of the metal support 10 is greater than 100 μm, it is difficult to form through holes 5 having the above-described average opening diameter in some cases.

Moreover, the surface area ratio ΔS at the interface between the metal support 10 and the gas separation layer 102 is preferably in a range of 20% to 80% and more preferably in a range of 60% to 80%. When the surface area ratio ΔS is set to be 20% or greater, the adhesiveness of the metal support 10 to the gas separation layer 102 can be improved. Since the surface tension increases, this is preferable from the viewpoint of preventing permeation of the coating composition into the through holes 5 at the time of formation of the gas separation layer 102 and at the time of coating the gas separation layer 102 with the coating composition.

Here, in order to set the surface area ratio ΔS at the interface between the metal support 10 and the gas separation layer 102 to be in the above-described range, the surface area ratio ΔS of the surface of the metal support 10 may be set to be in a range of 20% to 80% by roughening the surface of the metal support 10 before the gas separation layer 102 is formed.

Here, the surface area ratio ΔS is a value acquired, using the following Equation (i), from an actual area Sx obtained from three-dimensional data obtained by measuring 512× 512 points of the surface having a size of 50 μm×50 μm with an atomic force microscope according to an approximate three-point method and a geometric measurement area S0.

$$\Delta S = (Sx - S0)/S0 \times 100 (\%) \qquad (i)$$

The metal used as a material of the metal support 10 is not particularly limited, and examples thereof include various metals such as aluminum, stainless steel, and copper.

Among these, aluminum (aluminum alloy) is preferable from the viewpoints of excellent workability, strength, and flexibility.

In the present specification, various substrates formed of the above-described aluminum or aluminum alloys are collectively referred to as aluminum substrates. Examples of foreign elements which may be included in the above-described aluminum alloys include silicon, iron, copper, manganese, magnesium, chromium, zinc, bismuth, nickel, and titanium, and the content of the foreign elements in an alloy is 10% by mass or less.

In the present invention, when the heat resistance of a support is improved using a metal support, it is possible to prevent a support from being deformed or damaged by heat during formation of a gas separation layer and heat during a gas separation operation and to prevent a degradation of gas separation performance by properly supporting the gas separation layer.

Here, the support of the gas separation layer needs to have gas permeability. Accordingly, in a case where a metal is used as a material of the support, it is considered that plural through holes are formed as passages of gas.

However, when only through holes are simply formed in the case where a metal is used as the support, the present inventors found that there are problems in that the coating composition of the gas separation layer is leaked in the through holes, the gas separation layer is damaged due to the pressure during the gas separation operation, or the support is deformed or damaged so that the support cannot properly support the gas separation layer. When compared to a support using an organic material, it is considered that these problems are caused by a factor of a metal support being inferior in elasticity and stretchability.

On the contrary, in the present invention, a metal support is used and the average opening diameter and the opening ratio of through holes formed in the metal support are respectively set to be in the above-described ranges. In this manner, the gas separation composite of the present invention may include high heat resistance and mechanical strength, the metal support can properly support the gas separation layer by means of preventing leakage of the coating composition or damage to the gas separation layer, thereby obtaining excellent gas permeability and gas separation properties.

[Gas Separation Layer]

The gas separation layer 102 allows selective permeation and separation of a predetermined gas component based on the properties of each material and is formed on the metal support 10.

The thickness of the gas separation layer 102 is in a range of 0.1 μm to 5 μm. When the thickness of the gas separation layer 102 is less than 0.1 μm, a defect may occur in the gas separation layer and this may lead to a degradation of the gas separation properties. Further, when the thickness of the gas separation layer 102 is greater than 5 μm, the gas permeability may be degraded.

From the viewpoints described above, the thickness of the gas separation layer 102 is preferably in a range of 0.1 μm to 2 μm.

The type of the gas separation layer 102 is not particularly limited, and various known gas separation membranes such as a dissolution diffusion film and a facilitated transport film can be used. Further, the type of gas separated by the gas separation layer 102 is not limited, and gas obtained by separating acidic gas such as carbon dioxide from raw material gas may be exemplified.

Here, the present invention can be suitably applied to the gas separation composite 100 including the gas separation layer 102, which is formed by performing processes including a heating process.

Moreover, the present invention can be suitably applied to the gas separation composite 100 which includes the gas separation layer 102 having gas separation properties that can be improved through heating.

As the gas separation layer 102 having gas separation properties that can be improved through heating, insoluble polyimide may be exemplified.

The gas separation layer 102 including insoluble polyimide is formed by coating the metal support 10 with a solution (coating solution) of a polyimide compound or a polyimide precursor, drying the metal support, forming a film formed to include a polyimide compound or a polyimide precursor, applying a heat treatment at 200° C. or higher to the film, and insolubilizing the polyimide compound constituting the film to obtain an insoluble polyimide compound or ring-opening the polyimide precursor constituting the film to obtain an insoluble polyimide compound.

When the heat treatment at 200° C. or higher is applied thereto, the polyimide compound constituting the film is insolubilized by adopting a cross-linked structure or the like. In this manner, the gas separation performance is further improved and resistance to impurity components included in gas such as toluene is also improved.

Moreover, the polyimide precursor is polyamic acid or a derivative thereof and is a compound which is ring-closed when heated at 200° C. or higher and generates a polyimide compound.

Since a metal support having high heat resistance is used as a support in the present invention, the present invention can be suitably applied to a case where insoluble polyimide accompanied by a heat treatment at 200° C. or higher is used as the gas separation layer 102.

In a case where a material containing an insoluble polyimide compound is used as a gas separation layer, the content of the insoluble polyimide compound is not particularly limited as long as desired gas separation performance is obtained. From the viewpoints of gas separation properties and gas permeability, the content of the insoluble polyimide compound is preferably in a range of 20% by mass to 100% by mass.

Here, the "insoluble polyimide compound" indicates a polyimide compound having a solubility of 20 mg/100 g or less in diacetylamide at 20° C. The solubility of the insoluble polyimide compound in diacetylamide at 20° C. is preferably 15 mg/100 g or less and more preferably 10 mg/100 g or less. Further, the solubility of the insoluble polyimide compound in diacetylamide at 20° C. may be 0 mg/100 g and typically 0.1 mg/100 g or greater.

In addition, for the purpose of sufficiently insolubilizing the polyimide compound, the time for the heat treatment at 200° C. or higher is preferably 0.2 time or longer and more preferably 0.5 time or longer. From the viewpoint of production efficiency, the time for the heat treatment is preferably within 10 hours, more preferably within 5 hours, and still more preferably within 2 hours.

(Polyimide Compound)

It is preferable that the insoluble polyimide used as the gas separation layer of the gas separation composite of the present invention is a polyimide compound which is insolubilized by a heat treatment at 200° C. or higher. The polyimide compound insolubilized by the heat treatment at 200° C. or higher is not particularly limited as long as the compound is insolubilized by the heat treatment at 200° C.

or higher. It is assumed that the insolubilization is caused by a cross-linked structure being formed between molecules or in a molecular due to a decarboxylation reaction resulting from the heat treatment. It is preferable that the polyimide compound insolubilized by the heat treatment at 200° C. or higher is capable of forming a film by being applied. More specifically, the solubility of the polyimide compound, insolubilized by the heat treatment at 200° C. or higher, in dimethylacetamide at 20° C. is preferably 500 mg/100 g or greater and more preferably in a range of 1,000 to 50,000 mg/100 g.

It is preferable that the polyimide compound insolubilized by the heat treatment at 200° C. or higher includes a repeating unit represented by the following Formula (I). The polyimide compound may include two or more kinds of repeating units represented by the following Formula (I).

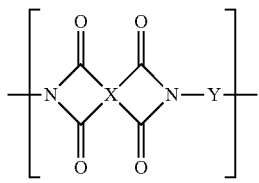

Formula (I)

In Formula (I), X represents a group having a structure represented by any of the following Formulae (I-1) to (I-28). In the following Formulae (I-1) to (I-28), the symbol "*" represents a binding site with respect to a carbonyl group of Formula (I). X in Formula (I) is referred to as a mother nucleus in some cases, and this mother nucleus X is preferably a group represented by Formulae (I-1), (I-2), or (I-4), more preferably a group represented by Formula (I-1) or (I-4), and particularly preferably a group represented by Formula (I-1).

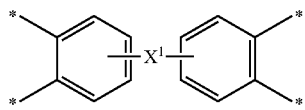

(I-1)

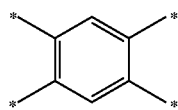

(I-2)

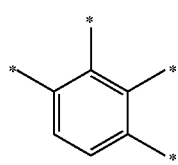

(I-3)

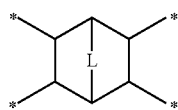

(I-4)

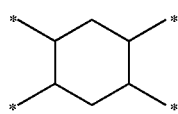

(I-5)

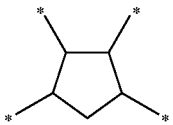

(I-6)

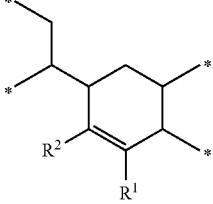

(I-7)

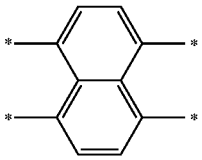

(I-8)

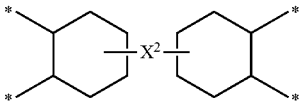

(I-9)

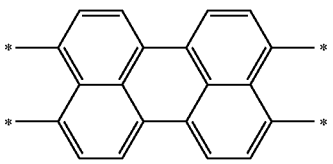

(I-10)

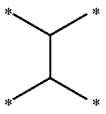

(I-11)

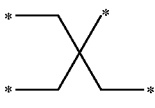

(I-12)

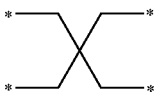

(I-13)

(I-14)

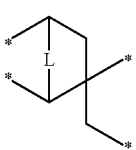

(I-15)

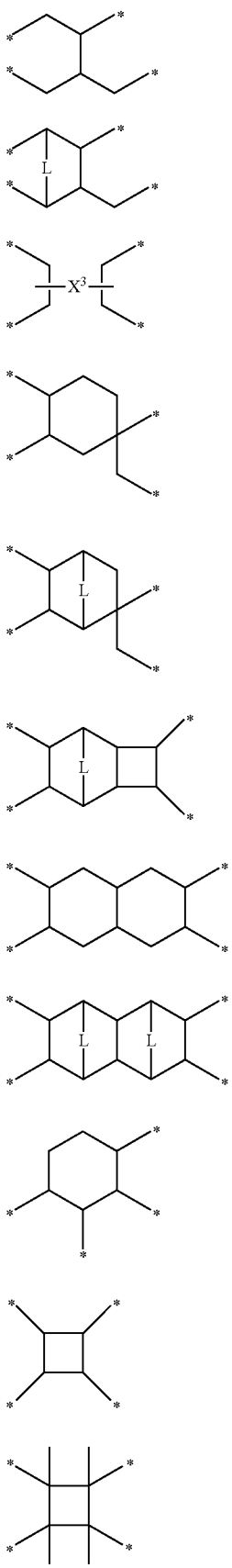
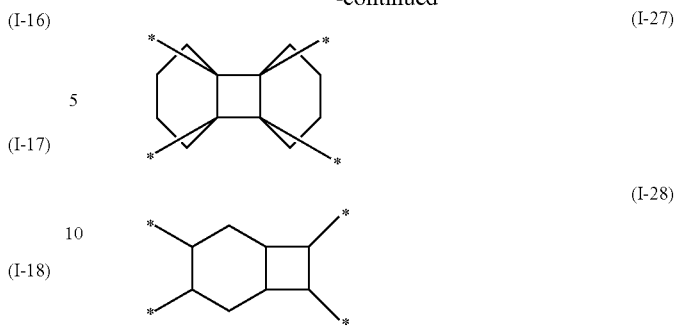

In Formulae (I-1), (I-9), and (I-18), $X^1$ to $X^3$ represent a single bond or a divalent linking group. As the divalent linking group, —C($R^x$)$_2$— ($R^x$ represents a hydrogen atom or a substituent group, and in a case where $R^x$ represents a substituent group, $R^x$'s may be linked to each other and form a ring), —O—, —SO$_2$—, —C(=O)—, —S—, —NR$^Y$— ($R^Y$ represents a hydrogen atom, an alkyl group (preferably a methyl group or an ethyl group), an aryl group (preferably a phenyl group)), —C$_6$H$_4$— (phenylene group), or a combination of these is preferable and a single bond or —C($R^x$)$_2$— is more preferable. When $R^x$ represents a substituent group, a group Z of substituent groups described below is specifically exemplified. Among these, an alkyl group (the preferable range is the same as that of the alkyl group in the group Z of substituent groups described below) is preferable, an alkyl group having a halogen atom as a substituent group is more preferable, and trifluoromethyl is particularly preferable. Further, in regard to the expression "may be linked to each other and form a ring" in the present specification, the linkage may be made by a single bond or a double bond and a cyclic structure may be formed or condensation may be made and a condensed ring structure may be formed. Moreover, in Formula (I-18), $X^3$ is linked to any one of two carbon atoms shown on the left side in the formula and linked to any one of two carbon atoms shown on the right side in the formula.

In Formulae (I-4), (I-15), (I-17), (I-20), (I-21), and (I-23), L represents —CH=CH— or —CH$_2$—.

In Formula (I-7), $R^1$ and $R^2$ represent a hydrogen atom or a substituent group. Examples of the substituent group include groups shown as examples of the group Z of substituent groups described below. $R^1$ and $R^2$ may be bonded to each other and form a ring.

$R^1$ and $R^2$ preferably represent a hydrogen atom or an alkyl group, more preferably represent a hydrogen atom, a methyl group, or an ethyl group, and still more preferably represent a hydrogen atom.

The carbon atoms shown in Formulae (I-1) to (I-28) may further have substituent groups. Specific examples of the substituent groups are the same as the group Z of substituent groups described below. Among these, an alkyl group or an aryl group is preferable.

In Formula (I), Y represents an arylene group. Y represents preferably an arylene group having 6 to 20 carbon atoms, more preferably an arylene group having 6 to 15 carbon atoms, and still more preferably a phenylene group. It is preferable that the arylene group as Y has a substituent group, and examples of the substituent group include the group Z of substituent groups described below. It is preferable that the polyimide compound includes both of a repeating unit of Formula (I) in which Y has a polar group and a repeating unit of Formula (I) in which Y does not have a polar group. Examples of the polar group which can be included in Y include a carboxy group, an amino group, a hydroxyl group, a sulfone group, a halogen atom, or an alkoxy group. When the polyimide compound includes a repeating unit of Formula (I) in which Y has a polar group, the polymer is suitably densed and the gas separation selectivity of a film when used for the gas separation membrane can be further improved.

The ratio of the repeating unit represented by Formula (I) to the entire repeating units of the polyimide compound insolubilized by the heat treatment at 200° C. or higher is not particularly limited and appropriately adjusted in consideration of gas permeability and gas separation selectivity according to the purpose of gas separation (recovery rate, purity, or the like).

The polyimide compound used in the present invention and insolubilized by the heat treatment at 200° C. or higher is synthesized using a tetracarboxylic dianhydride and a diamine (the term "diamine" or "diamine compound" in the present specification indicates a compound having two or more amino groups and preferably a compound having two amino groups) as raw materials. When described using an example of the repeating unit of Formula (I), Y is a diamine component and the structure of a portion from which Y is removed is a tetracarboxylic dianhydride component. That is, Formula (I) shows a repeating unit formed of one tetracarboxylic dianhydride component and one diamine component. The amount of the repeating unit of Formula (I) is preferably 10% by mole or greater, more preferably 30% by mole or greater, and still more preferably 50% by mole or greater with respect to the total amount (100% by mole) of repeating units, each of which is formed of one tetracarboxylic dianhydride component and one diamine component. Further, the amount thereof may be 70% by mole or greater, 80% by mole or greater, and preferably 100% by mole.

Unless the amount of the repeating unit of Formula (I) with respect to the total amount of the repeating units is 100% by mole, the structure of the repeating unit of the remainder is not particularly limited. Examples of the structure include a structure in which Y of Formula (I) is replaced by a structure derived from substituted or unsubstituted bis(4-aminophenyl) ether; a structure in which Y of Formula (I) is replaced by a structure derived from substituted or unsubstituted methylene dianiline; a structure in which Y of Formula (I) is replaced by a structure derived from substituted or unsubstituted 4,4'-diaminodiphenylsulfone; and a structure in which Y of Formula (I) is replaced by a structure derived from substituted or unsubstituted ditolylamine, but the present invention is not limited thereto.

The weight average molecular weight of the polyimide compound used in the present invention is preferably in a range of 10,000 to 1,000,000, more preferably in a range of 15,000 to 500,000, and still more preferably in a range of 20,000 to 200,000.

The molecular weight and the dispersity in the present specification are set to values measured using a gel permeation chromatography (GPC) method unless otherwise specified and the molecular weight is set to a weight average molecular weight in terms of polystyrene. A gel including an aromatic compound as a repeating unit is preferable as a gel filling a column used for the GPC method and examples of the gel include a gel formed of a styrene-divinylbenzene copolymer. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 to 2 mL/min and most preferable that the measurement is performed at a flow rate thereof of 0.5 to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

—Synthesis of Polyimide Compound—

The polyimide compound which can be used in the present invention and is insolubilized by the heat treatment at 200° C. or higher can be synthesized by performing condensation and polymerization of a specific bifunctional acid dianhydride (tetracarboxylic dianhydride) and a specific diamine. As the method, a technique described in a general book (for example, "The Latest Polyimide ~Fundamentals and Applications~" edited by Toshio Imai and Rikio Yokota, NTS Inc., Aug. 25, 2010, pp. 3 to 49) can be appropriately selected.

In the synthesis of the polyimide compound which can be used in the present invention and is insolubilized by the heat treatment at 200° or higher, at least one tetracarboxylic dianhydride used as a raw material is represented by the following Formula (IV). It is preferable that all tetracarboxylic dianhydrides used as a raw material are represented by the following Formula (IV).

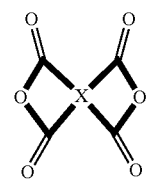

Formula (IV)

In Formula (IV), X has the same definition as that for X in Formula (I).

Specific examples of the tetracarboxylic dianhydride which can be used in the present invention are as follows, but the present invention is not limited thereto.

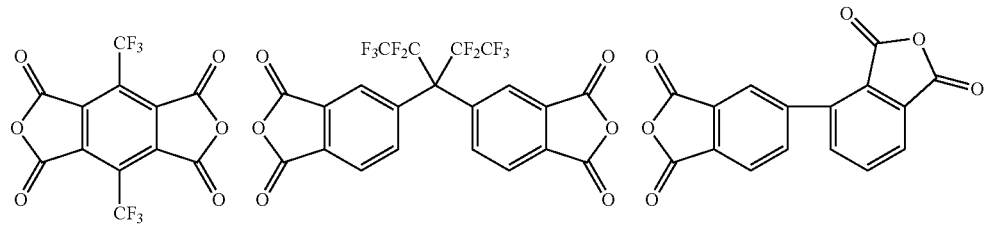

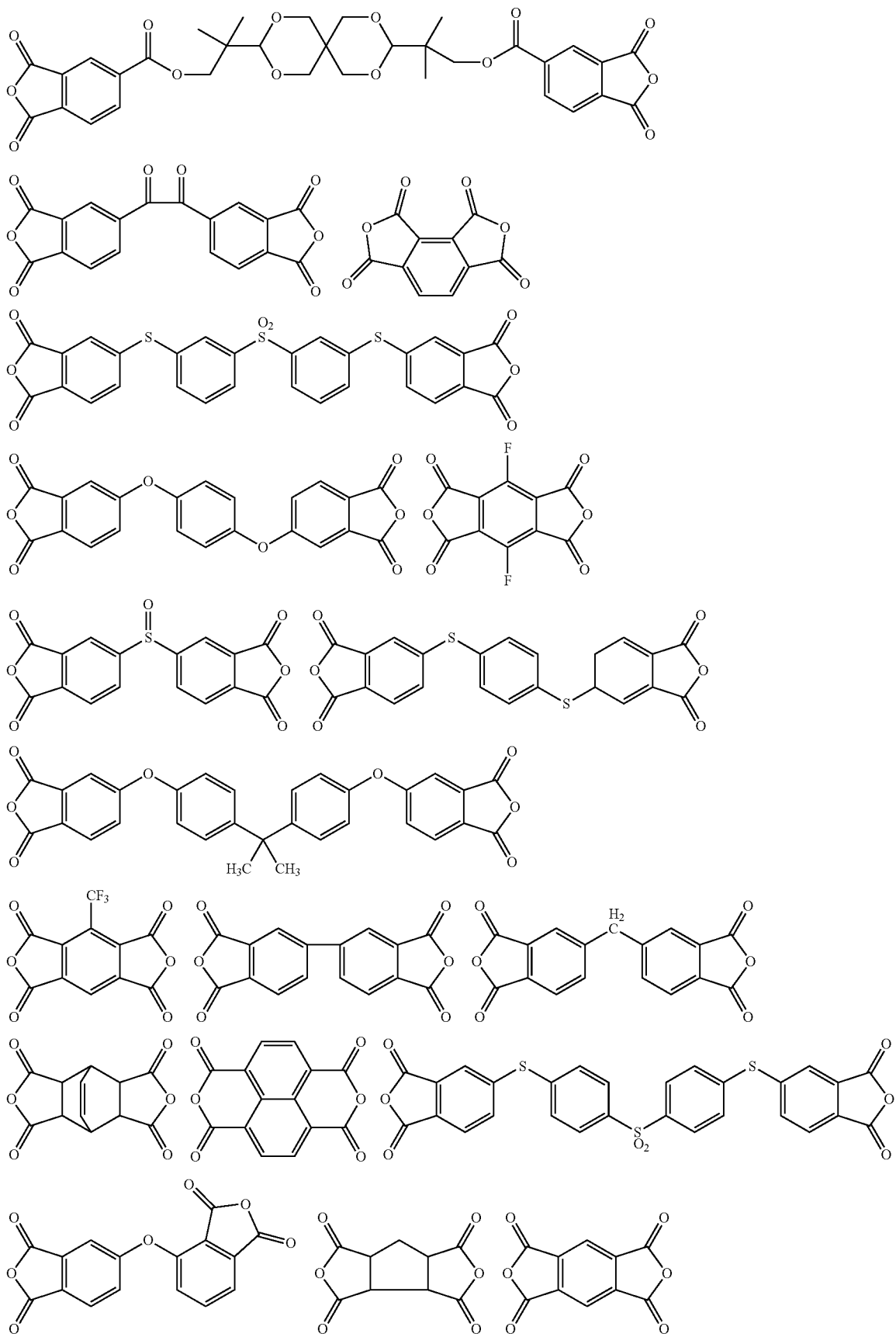

-continued
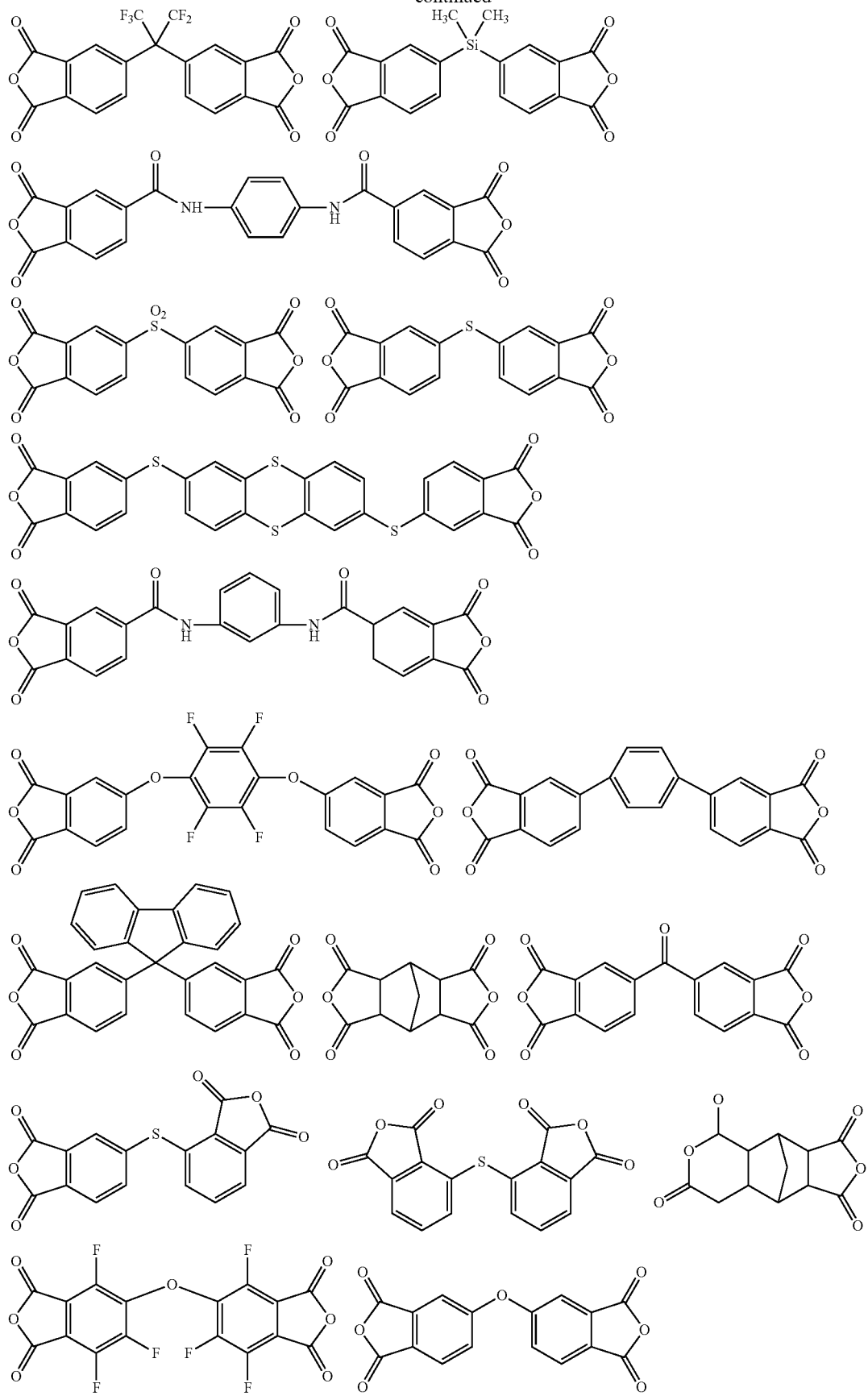

-continued
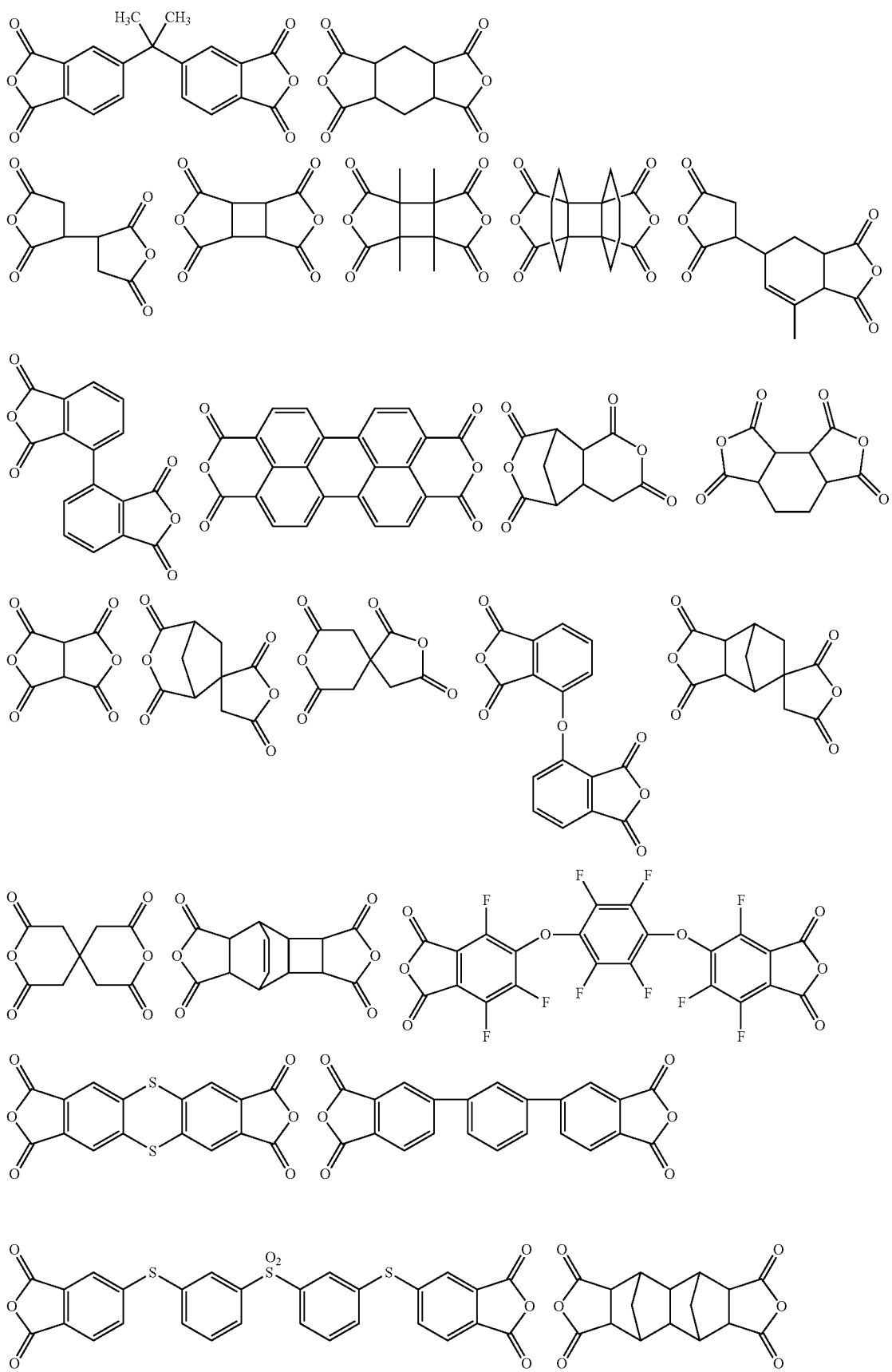

-continued

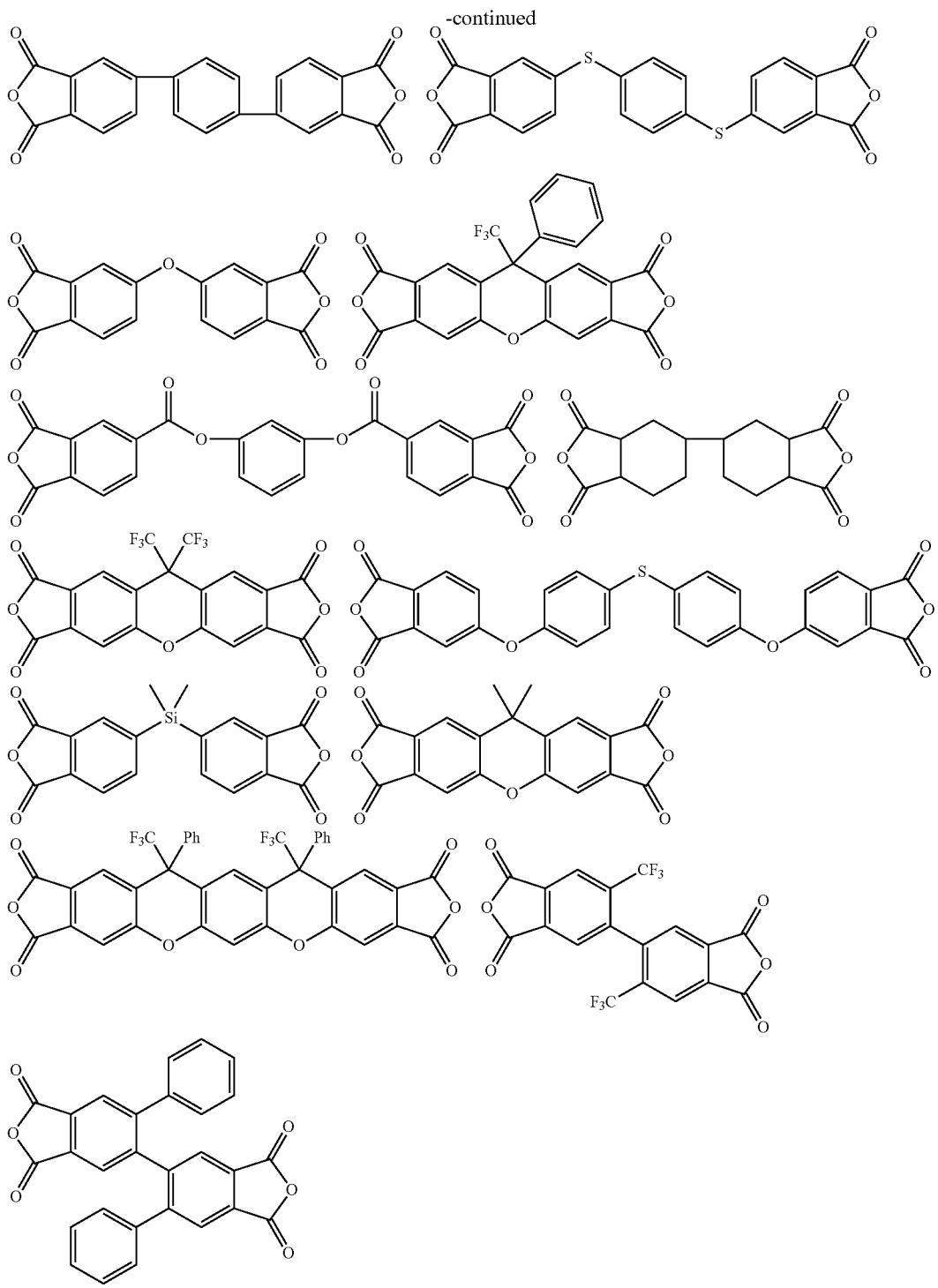

In the synthesis of the polyimide compound which can be used in the present invention and is insolubilized by the heat treatment at 200° C. or higher, at least one diamine compound used as a raw material is aromatic hydrocarbon having at least two amino groups. The number of carbon atoms of the aromatic hydrocarbon having at least two amino groups is preferably in a range of 6 to 20 and more preferably in a range of 6 to 15. As the aromatic hydrocarbon, phenylene diamine is still more preferable. The aromatic hydrocarbon having at least two amino groups may have a substituent group other than an amino group, and examples of the substituent group include the group Z of substituent groups described below. As the above-described aromatic hydrocarbon having at least two amino groups, aromatic hydrocarbon having two amino groups is preferable.

Specific examples of the above-described aromatic hydrocarbon having at least two amino groups include the followings, but the present invention is not limited thereto.

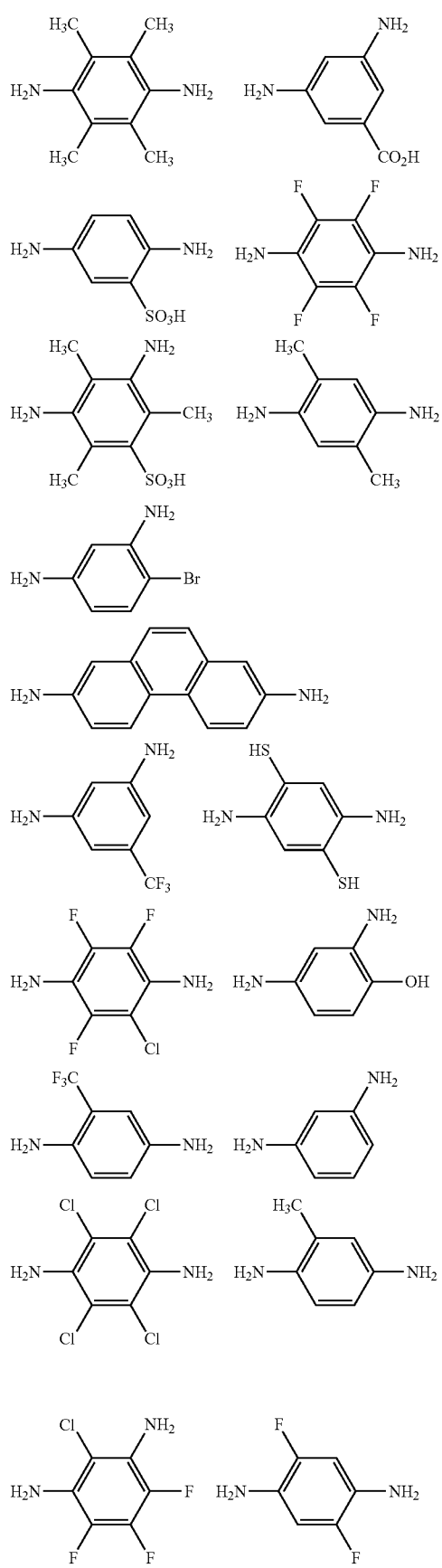
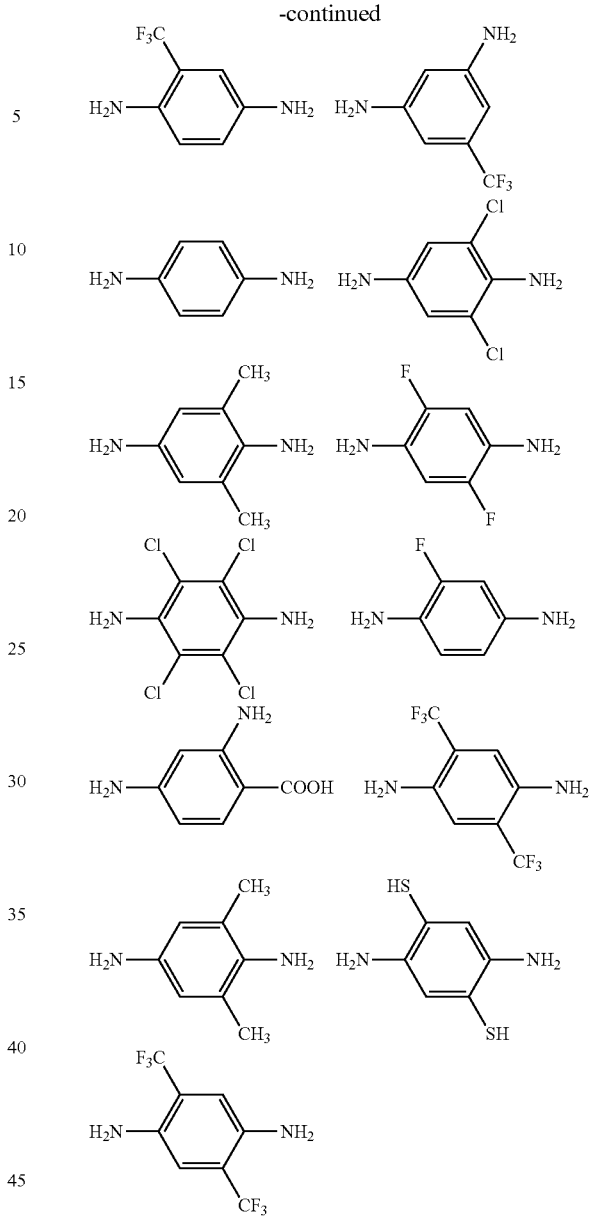

The polyimide compound used in the present invention and insolubilized by the heat treatment at 200° C. or higher can be obtained by mixing the above-described respective raw materials in a solvent and performing condensation and polymerization using a typical method.

The solvent is not particularly limited. Examples thereof include an ester-based organic solvent such as methyl acetate, ethyl acetate, or butyl acetate; an aliphatic ketone organic solvent such as acetone, methyl ethyl ketone, methyl isobutyl ketone, diacetone alcohol, cyclopentanone, or cyclohexanone; an ether-based organic solvent such as ethylene glycol dimethyl ether, dibutyl butyl ether, tetrahydrofuran, methyl cyclopentyl ether, or dioxane; an amide-based organic solvent such as N-methylpyrrolidone, 2-pyrrolidone, dimethylformamide, dimethylimidazolidinone, or dimethylacetamide; and a sulfur-containing organic solvent such as dimethyl sulfoxide or sulfolane. These organic solvents can be suitably selected within the range in which a tetracarboxylic dianhydride serving as a reaction substrate, a diamine compound, polyamic acid which is a reaction intermediate, and a polyimide compound which is a final product can be dissolved. Among these, an ester-based organic solvent (preferably butyl acetate), an aliphatic ketone organic solvent (preferably methyl ethyl ketone, methyl isobutyl ketone, diacetone alcohol, cyclopentanone, or cyclohexanone), an ether-based organic solvent (diethylene glycol monomethyl ether or methyl cyclopentyl ether), an amide-based organic solvent (preferably N-methylpyrrolidone), or a sulfur-containing organic solvent (dimethyl sulfoxide or sulfolane) is preferable. In addition, these can be used alone or in combination of two or more kinds thereof.

A temperature which can be usually employed for the synthesis of the polyimide compound can be employed without being particularly limited to the polymerization reaction temperature. Specifically, the temperature is preferably in a range of −40° C. to 60° C. and more preferably in a range of −30° C. to 50° C.

The polyimide compound can be obtained by imidizing the polyamic acid, which is generated by the above-described polymerization reaction, through a dehydration ring-closure reaction in a molecule. As a method of the dehydration ring-closure reaction, a method described in a general book (for example, "The Latest Polyimide ~Fundamentals and Applications~" edited by Toshio Imai and Rikio Yokota, NTS Inc., Aug. 25, 2010, pp. 3 to 49) can be used as reference. A thermal imidization method of performing heating in a temperature range 120° C. to 200° C. and removing water generated as a by-product to the outside the system for a reaction or a so-called chemical imidization method in which a dehydrating condensation agent such as an acetic anhydride, dicyclohexylcarbodiimide, or triphenyl phosphite is used in the coexistence of a basic catalyst such as pyridine, trimethylamine, or DBU is preferably used.

In the present invention, the total concentration of the tetracarboxylic dianhydride and the diamine compound in the polymerization reaction solution of the polyimide compound is not particularly limited, but is preferably in a range of 5 to 70% by mass, more preferably in a range of 5 to 50% by mass, and still more preferably in a range of 5 to 30% by mass.

(Polyimide Precursor)

The polyimide precursor used to produce the gas separation composite of the present invention is polyamic acid or a derivative thereof and is not particularly limited as long as the precursor is ring-closed by the heat treatment at 200° C. or higher and generates insoluble polyimide. A polyimide precursor which is capable of forming a film by being applied is preferable. More specifically, the solubility of the polyimide precursor in dimethylacetamide at 20° C. is preferably 500 mg/100 g or greater and more preferably in a range of 1,000 to 50,000 mg/100 g.

It is preferable that the polyimide precursor includes a repeating unit represented by the following Formula (II). The polyimide compound may include two or more repeating units represented by the following Formula (II).

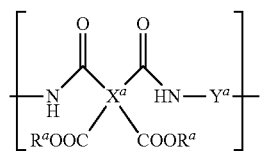

Formula (II)

In Formula (II), $X^a$ represents a tetravalent aliphatic group, a tetravalent aromatic group, or a tetravalent group formed by combining one or two or more kinds selected from an aliphatic group and an aromatic group. Here, the "tetravalent group formed by combining one or two or more kinds selected from an aliphatic group and an aromatic group" includes a tetravalent group formed by a plurality (two or three or more) of aromatic groups being connected to each other with a single bond. Moreover, the aliphatic group may be linear, branched, or cyclic.

In a case where $X^a$ represents a tetravalent aliphatic group, the number of carbon atoms thereof is preferably in a range of 3 to 20, more preferably in a range of 4 to 18, and still more preferably in a range of 6 to 15.

In a case where $X^a$ represents a tetravalent aromatic group, the number of carbon atoms thereof is preferably in a range of 4 to 20, more preferably in a range of 4 to 18, and still more preferably in a range of 5 to 15.

In a case where $X^a$ represents a tetravalent group formed by combining one or two or more kinds selected from an aliphatic group and an aromatic group, the number of carbon atoms thereof is preferably in a range of 4 to 20 and more preferably in a range of 5 to 15. Further, as the tetravalent group formed by combining one or two or more kinds selected from an aliphatic group and an aromatic group, a tetravalent group having a structure in which two aromatic rings are connected to each other with a single bond or an aliphatic group is preferable.

It is preferable that $X^a$ represents a group having a structure represented by any of the following Formulae (I-1) to (I-28).

In Formula (II), $R^a$ represents a hydrogen atom, an alkyl group having 1 to 6 carbon atoms (preferably an alkyl group having 1 to 4 carbon atoms and more preferably a methyl group, an ethyl group, or a propyl group), or an alkylsilyl group having 3 to 9 carbon atoms (preferably an alkylsilyl group having 3 to 6 carbon atoms). It is more preferable that both of two $R^a$'s represent a hydrogen atom. In a case where $R^a$ represents an alkylsilyl group, a trialkylsilyl group is preferable.

In Formula (II), $Y^a$ represents a divalent aliphatic group, a divalent aromatic group, or a divalent group formed by combining one or two or more kinds selected from an aliphatic group and an aromatic group. Here, the "divalent group formed by combining one or two or more kinds selected from an aliphatic group and an aromatic group" includes a divalent group formed by a plurality (two or three or more) of aromatic groups being connected to each other with a single bond. Moreover, the aliphatic group may be linear, branched, or cyclic.

In a case where $Y^a$ represents a divalent aliphatic group, the number of carbon atoms thereof is preferably in a range of 1 to 30 and more preferably in a range of 2 to 20.

In a case where $Y^a$ represents a divalent aromatic group, the number of carbon atoms thereof is preferably in a range of 4 to 20, more preferably in a range of 4 to 15, and still more preferably in a range of 5 to 15. In a case where $Y^a$ represents a divalent aromatic group, $Y^a$ represents preferably an arylene group, more preferably an arylene group having 6 to 20 carbon atoms, still more preferably an arylene group having 6 to 15 carbon atoms, and even still more preferably a phenylene group.

In a case where $Y^a$ represents a divalent group formed by combining one or two or more kinds selected from an aliphatic group and an aromatic group, the number of carbon atoms thereof is preferably in a range of 5 to 30 and more preferably in a range of 6 to 20. Further, as the divalent group formed by combining one or two or more kinds selected from an aliphatic group and an aromatic group, a divalent group having a structure in which two aromatic rings are connected to each other with a single bond or an aliphatic group is preferable. In this case, the number of carbon atoms of the structure in which two aromatic rings are connected to each other with a single bond or an aliphatic group is preferably in a range of 10 to 30, more preferably in a range of 10 to 20, still more preferably in a range of 12 to 20, and even still more preferably in a range of 12 to 18. In the case where $Y^a$ represents a divalent group formed by combining one or two or more kinds selected from an aliphatic group and an aromatic group, the aromatic group is preferably an arylene group, more preferably an arylene group having 6 to 20 carbon atoms, still more preferably an arylene group having 6 to 15 carbon atoms, and even still more preferably a phenylene group.

It is preferable that the polyimide precursor used in the present invention is synthesized using a tetracarboxylic dianhydride and a diamine as raw materials in the same manner as that of the polyimide compound. When described using an example of the repeating unit of Formula (II), $Y^a$ is a diamine component and the structure of a portion from which $Y^a$ is removed is a tetracarboxylic dianhydride component. The amount of the repeating unit of Formula (II) is preferably 10% by mole or greater, more preferably 30% by mole or greater, and still more preferably 50% by mole or greater with respect to the total amount (100% by mole) of repeating units, each of which is formed of one tetracarboxylic dianhydride component and one diamine component. Further, the amount thereof may be 70% by mole or greater, 80% by mole or greater, and preferably 100% by mole.

The weight average molecular weight of the polyimide precursor used in the present invention is preferably in a range of 10,000 to 1,000,000, more preferably in a range of 15,000 to 500,000, and still more preferably in a range of 20,000 to 200,000.

The polyimide precursor is commercially available. Examples of the commercially available products which can be used as the polyimide precursor in the present invention include U-IMIDE VARNISH (trade name, manufactured by Unitika Limited.), U-VARNISH (trade name, manufactured by Ube Industries, Ltd.), and PYRE-ML (trade name, manufactured by Industrial Summit Technology Corp.).

—Synthesis of Polyimide Precursor—

The method of synthesizing the polyimide precursor is not particularly limited. For example, the polyimide precursor can be obtained by dissolving a diamine having a desired structure in N-methyl-pyrrolidone or N,N-dimethylacetamide in a nitrogen atmosphere, adding a tetracarboxylic dianhydride having a desired structure to the solution while the solution is stirred, and stirring the solution at a temperature of 80° C. for approximately 2 hours using a warm water bath or the like.

Examples of the group Z of substituent groups include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, p-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxy group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazine group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with a part or entirety of the structural site and form an aromatic ring or an unsaturated hetero ring.

When a compound or a substituent group includes an alkyl group or an alkenyl group, these may be linear or branched and may be substituted or non-substituted. In addition, when a compound or a substituent group includes an aryl group or a heterocyclic group, these may be a single ring or condensed and may be substituted or non-substituted.

In the present specification, when a group is described as only a substituent group, the group Z of substituent groups can be used as reference unless otherwise specified. Further, when only the names of the respective groups are described (for example, a group is described as an "alkyl group"), the preferable range and the specific examples of the corresponding group in the group Z of substituent groups are applied.

(Other Components)

Since membrane physical properties are adjusted, various polymer compounds can be added to the insoluble polyimide used as the gas separation layer of the gas separation composite of the present invention. Examples of the polymer compound which can be used include an acrylic polymer, a polyurethane resin, a polyamide resin, a polyester resin, an epoxy resin, a phenol resin, a polycarbonate resin, a polyvinyl butyral resin, a polyvinyl formal resin, shellac, a vinyl-based resin, an acrylic resin, a rubber-based resin, waxes, and other natural resins. Further, these may be used in combination of two or more kinds thereof.

Moreover, a non-ionic surfactant, a cationic surfactant, or an organic fluoro compound can be added in order to adjust liquid properties.

Specific examples of the surfactant include anionic surfactants such as alkyl benzene sulfonate, alkyl naphthalene sulfonate, higher fatty acid salts, sulfonate of higher fatty ester, sulfuric ester salts of higher alcohol ether, sulfonate of higher alcohol ether, alkyl carboxylate of higher alkyl sulfonamide, and alkyl phosphate; non-ionic surfactants such as polyoxyethylene alkyl ether, polyoxyethylene alkyl phenyl ether, polyoxyethylene fatty acid ester, sorbitan fatty acid ester, an ethylene oxide adduct of acetylene glycol, an ethylene oxide adduct of glycerin, and polyoxyethylene sorbitan fatty acid ester; and amphoteric surfactants such as alkyl betaine and amide betaine; a silicon-based surfactant; and a fluorine-based surfactant, and the surfactant can be suitably selected from known surfactants of the related art and derivatives thereof.

Further, a polymer dispersing agent may be included, and specific examples of the polymer dispersing agent include polyvinyl pyrrolidone, polyvinyl alcohol, polyvinyl methyl ether, polyethylene oxide, polyethylene glycol, polypropylene glycol, and polyacrylamide. Among these, polyvinyl pyrrolidone is preferably used.

The gas separation composite of the present invention may include layers other than the above-described metal support and the gas separation layer. Further, other layers such as an adhesive layer may be included in a portion between the metal support and the gas separation layer.

The gas separation composite of the present invention can be suitably used according to a gas separation recovery method and a gas separation purification method. For example, the gas separation composite of the present invention can be used as a gas separation membrane which is capable of efficiently separating specific gas from a gas mixture containing gas, for example, hydrocarbon such as hydrogen, helium, carbon monoxide, carbon dioxide, hydrogen sulfide, oxygen, nitrogen, ammonia, a sulfur oxide, a nitrogen oxide, methane, or ethane; unsaturated hydrocarbon such as propylene; or a perfluoro compound such as tetrafluoroethane. Particularly, the gas separation composite of the present invention is suitably used as a gas separation membrane selectively separating carbon dioxide from a gas mixture containing carbon dioxide and hydrocarbon (methane).

In the gas separation composite of the present invention in a case where gas (raw material gas) subjected to a separation treatment is mixed gas of carbon dioxide and methane, the permeation rate of the carbon dioxide at 40° C. and 5 MPa is preferably greater than 5 GPU and more preferably greater than 10 GPU. Further, the upper limit of the permeation rate of the carbon dioxide is not particularly limited, but is typically 500 GPU or less and may be 400 GPU or less or 200 GPU or less.

The ratio between permeation rates of carbon dioxide and methane ($R_{CO2}/R_{CH4}$) is preferably 15 or greater, more preferably 20 or greater, still more preferably 25 or greater, even still more preferably 30 or greater, and even still more preferably 40 or greater. The upper limit of the ratio between the permeation rates is not particularly limited, but is typically 100 or less. $R_{CO2}$ represents the permeation rate of carbon dioxide and $R_{CH4}$ represents the permeation rate of methane.

Further, 1 GPU is $1 \times 10^{-6}$ cm$^3$ (STP)/cm$^2$·sec·cmHg.

In a case where the gas separation operation is performed using the gas separation composite of the present invention, the pressure at the time of gas separation is preferably in a range of 0.5 to 10 MPa, more preferably in a range of 1 to 10 MPa, and still more preferably in a range of 2 to 7 MPa. Further, the gas separation temperature is preferably in a range of −30° C. to 90° C. and more preferably in a range of 15° C. to 70° C.

In a case where the gases of the mixed gas containing carbon dioxide and methane gas are separated from each other, the mixing ratio of carbon dioxide to methane gas is not particularly limited. The mixing ratio thereof (carbon dioxide:methane gas) is preferably in a range of 1:99 to 99:1 (volume ratio) and more preferably in a range of 5:95 to 90:10.

Further, the gas separation composite of the present invention can be used for various known gas separation modules. Examples of the module include a spiral type module, a hollow fiber type module, a pleated module, a tubular module, and a plate & frame type module.

Moreover, when the gas separation composite of the present invention or a gas separation module using the gas separation composite is used, it is possible to obtain a gas separation device having means for performing separation and recovery of gas or performing separation and purification of gas. The gas separation composite of the present invention may be applied to a gas separation and recovery apparatus which is used together with an absorption liquid described in JP2007-297605A according to a membrane/absorption hybrid method.

[Method of Producing Metal Support]

Next, as an example of a method of producing a metal support, an example of a method of producing a metal support using an aluminum substrate (hereinafter, also referred to as an "aluminum support") will be described. The method of producing a metal support is an example of the preparing process of the present invention.

Here, the aluminum support of the present invention may be an aluminum substrate which includes a plurality of through holes in the thickness direction, an aluminum plate having an oxide film with a plurality of through holes in the thickness direction, or an aluminum plate from which an oxide film is removed by an oxide film removing process described below, that is, an aluminum plate formed of an aluminum substrate having a plurality of through holes in the thickness direction.

The method of producing an aluminum support will be described with reference to FIGS. 2A to 2E and FIGS. 3A to 3E, and each process will be described in detail.

FIGS. 2A to 2E are sectional views schematically illustrating an example of a method of producing an aluminum support according to the preferred embodiment of the present invention.

Figure 2D:
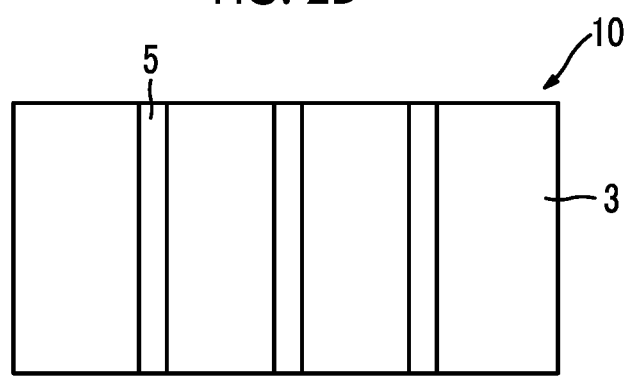

As illustrated in FIGS. 2A to 2E, the method of producing an aluminum support is a production method including an oxide film forming process of performing an oxide film forming treatment on the surface of an aluminum substrate 1 to form an oxide film 2 (FIGS. 2A and 2B); and a through hole forming process of performing an electrolytic dissolution treatment after the oxide film forming process to form through holes 5 and preparing an aluminum substrate 3 having through holes and an aluminum plate 10 that includes an oxide film 4 having through holes (FIGS. 2B and 2C).

Further, it is preferable that the method of producing an aluminum support includes an oxide film removing process, after the through hole forming process, of removing the oxide film 4 which has through holes and preparing the aluminum plate 10 formed of the aluminum substrate 3 having through holes (FIGS. 2C and 2D).

Figure 2E:
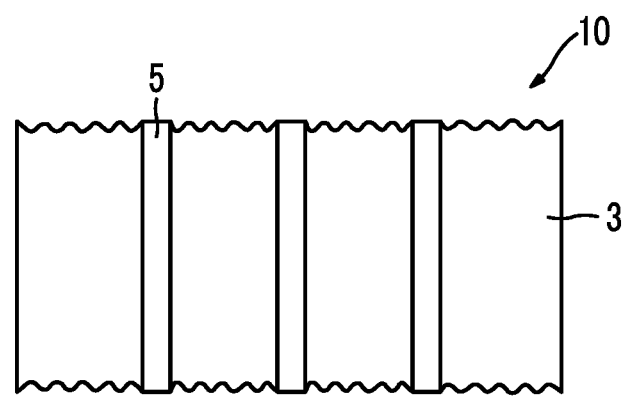

Similarly, it is preferable that the method of producing an aluminum support includes a roughening treatment process, after the oxide film removing process, of performing an electrochemical roughening treatment on the aluminum substrate 3 having through holes to prepare the aluminum plate 10 whose surface has been roughened (FIGS. 2D and 2E).

Further, the example illustrated in FIGS. 2A to 2E show the configuration in which the oxide film 2 is formed on one surface of the aluminum substrate 1 and the through holes 5 are formed, but the present invention is not limited to this configuration. As illustrated in FIGS. 3A to 3E, the configuration in which the oxide film 2 is formed on both surfaces (the surface and the rear surface) of the aluminum substrate 1 and the through holes 5 are formed may be employed.

Figure 3A:
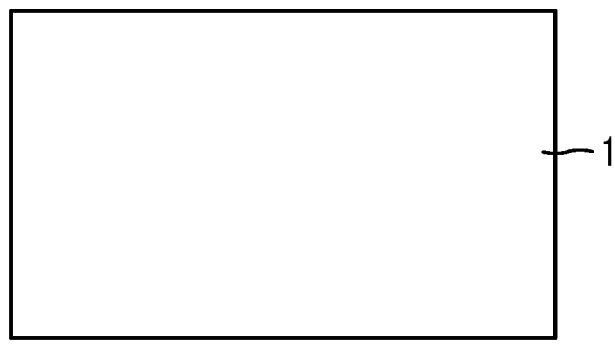
FIGS. 3A to 3E are sectional views schematically illustrating another example of a method of producing a metal support according to a preferred embodiment of the present invention.
Figure 3B:
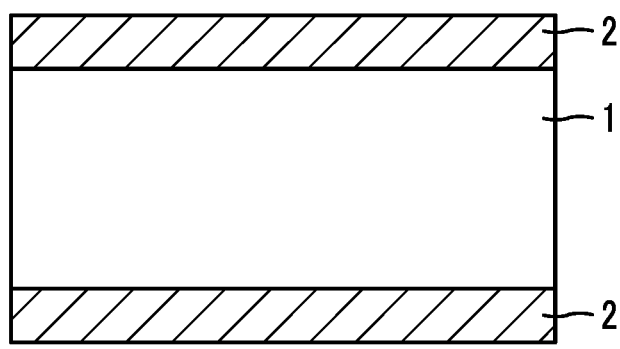
Figure 3C:
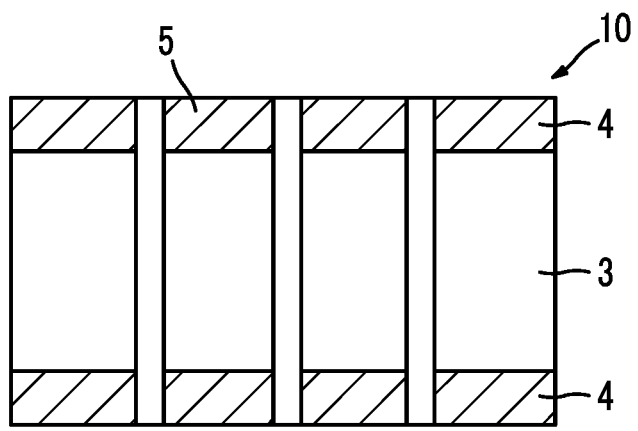

In other words, the method of producing an aluminum support may be a production method including an oxide film forming process of performing an oxide film forming treatment on the surface and the rear surface of the aluminum substrate 1 to form the oxide film 2 (FIGS. 3A and 3B) and a through hole forming process of performing an electrolytic dissolution treatment after the oxide film forming process to form through holes 5 and preparing the aluminum substrate 3 having through holes and the aluminum plate 10 that includes the oxide film 4 having through holes (FIGS. 3B and 3C).

Figure 3D:
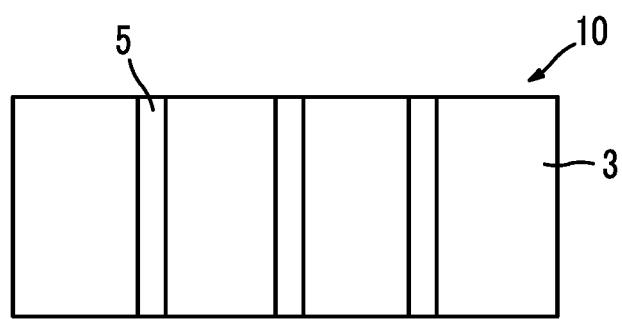

Further, similar to the example illustrated in FIGS. 2A to 2E, it is preferable that the method of producing an aluminum support includes an oxide film removing process of removing the oxide film 4 after the through hole forming process (FIGS. 3C and 3D).

Figure 3E:
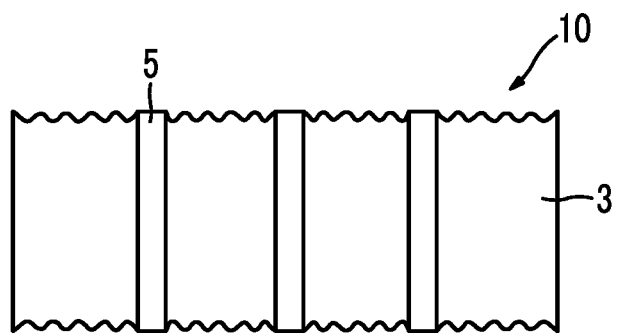

Similarly, it is preferable that the method of producing an aluminum support includes a roughening treatment process of performing an electrochemical roughening treatment on the aluminum substrate 3 after the oxide film removing process (FIGS. 3D and 3E).

[Oxide Film Forming Process]

In the production method of the present invention, the oxide film forming process is a process of performing an oxide film forming process on the surface of an aluminum substrate to form an oxide film.

The aluminum substrate is not particularly limited, and a known aluminum substrate (for example, alloy No. 1085, 1N30, 3003, or the like described in JIS standard H4000) can be used.

<Oxide Film Forming Treatment>

The oxide film forming treatment is not particularly limited, and a treatment similar to a known anodic oxidation treatment of the related art can be performed.

The anodic oxidation treatment can be performed by appropriately employing conditions or devices described in paragraphs [0063] to [0073] of JP2012-216513A.

The conditions of the anodic oxidation treatment cannot be unconditionally determined because the conditions vary depending on an electrolytic solution to be used. However, it is appropriate that the anodic oxidation treatment may be carried out under the conditions of an electrolytic solution concentration of 1 to 80% by mass, a liquid temperature of 5° C. to 70° C., a current density of 0.5 to 60 A/dm$^2$, a voltage of 1 to 100 V, an electrolysis time of 1 second to 20 minutes, and the conditions can be adjusted so as to obtain a desired oxide film amount.

In the present invention, it is preferable that the anodic oxidation treatment is carried out in a sulfuric acid solution.

In a case where the anodic oxidation treatment is performed in an electrolytic solution containing sulfuric acid, a DC or an AC may be applied to a space between an aluminum substrate and a counter electrode. In the case where a DC is applied to the aluminum substrate, the current density is preferably in a range of 1 to 60 A/dm$^2$ and more preferably in a range of 5 to 40 A/dm$^2$. In a case where the anodic oxidation treatment is continuously performed at a high speed, it is preferable that the current is allowed to flow at a low current density of 5 to 10 A/dm$^2$ when the anodic oxidation treatment is started and the current density is increased to a range of 30 to 50 A/dm$^2$ or greater than the range as the anodic oxidation treatment proceeds such that so-called "burning" in which the current is concentrated on a part of the aluminum substrate does not occur. In the case where the anodic oxidation treatment is continuously performed, it is preferable that the treatment is performed using a liquid power supply system that supplies power to the aluminum substrate through an electrolytic solution.

In the present invention, the amount of an oxide film formed by the anodic oxidation treatment is preferably in a range of 0.05 to 50 g/m$^2$ and more preferably in a range of 0.1 to 10 g/m$^2$.

[Through Hole Forming Process]

The through hole forming process is a process of performing an electrolytic dissolution treatment after the oxide film forming process to form through holes.

<Electrolytic Dissolution Treatment>

The electrolytic dissolution treatment is not particularly limited, and an acidic solution can be used as an electrolytic solution using a DC or an AC. Among the examples of the electrolytic solutions, an electrolytic solution mainly having hydrochloric acid or nitric acid is preferable.

In the present invention, as acidic solution used as an electrolytic solution other than nitric acid or hydrochloric acid, electrolytic solutions described in the specifications of U.S. Pat. Nos. 4,671,859 4,661,219B, 4,618,405B, 4,600,482B, 4,566,960B, 4,566,958B, 4,566,959B, 4,416,972B, 4,374,710B, 4,336,113B, and 4,184,932B can be used.

The concentration of the acidic solution is preferably in a range of 0.5 to 2.5% by mass and particularly preferably in a range of 0.7 to 2.0% by mass. Further, the liquid temperature of the acidic solution is preferably in a range of 20° C. to 80° C. and more preferably in a range of 30° C. to 60° C.

Further, an aqueous solution mainly including hydrochloric acid or nitric acid can be used by adding, until the solute is saturated from a concentration of 1 g/L, at least one of a nitric acid compound having nitrate ions such as aluminum nitrate, sodium nitrate, and ammonium nitrate; and a hydrochloric acid compound having hydrochloric ions such as aluminum chloride, sodium chloride, and ammonium chloride to an aqueous solution including hydrochloric acid or nitric acid at a concentration of 1 to 100 g/L.

Moreover, metals included in aluminum alloys, such as iron, copper, manganese, nickel, titanium, magnesium, or silica may be dissolved in an aqueous solution mainly having hydrochloric acid or nitric acid. It is preferable to use a solution obtained by adding aluminum chloride or aluminum nitrate to an aqueous solution having hydrochloric acid or nitric acid at a concentration of 0.5 to 2% by mass such that the concentration of aluminum ions becomes in a range of 3 to 50 g/L.

In the electrochemical dissolution treatment, a direct current is mainly used. However, in a case where an alternating current is used, an AC power supply wave thereof is not particularly limited, and a sine wave, a rectangular wave, a trapezoidal wave, or a triangular wave may be used. Among these, a rectangular wave or a trapezoidal wave is preferable and a triangular wave is particularly preferable.

(Nitric Acid Electrolysis)

In the present invention, through holes having an average opening diameter of 0.1 to 30 µm and an average opening ratio of 0.05% to 10% can be easily formed by the electrochemical dissolution treatment (hereinafter, also abbreviated as a "nitric acid dissolution treatment") using an electrolytic solution mainly having nitric acid.

Here, from the viewpoint of easily controlling dissolution points during formation of through holes, it is preferable that the nitric acid dissolution treatment is an electrolytic treatment carried out under the conditions of an average current density of 5 A/dm$^2$ or greater and an electric quantity of 50 C/dm$^2$ or greater using a direct current. Further, the average current density is preferably 100 A/dm$^2$ or less and the electric quantity is preferably 10,000 C/dm$^2$ or less.

In addition, the concentration or the temperature of the electrolytic solution in nitric acid electrolysis is not particularly limited, and electrolysis at 30° C. to 60° C. may be carried out using a nitric acid electrolytic solution having a high concentration, for example, a nitric acid concentration of 15 to 35% by mass or electrolysis at a high temperature, for example, 80° C. or higher can be carried out using a nitric acid electrolytic solution having a nitric acid concentration of 0.7 to 2% by mass.

(Hydrochloric Acid Electrolysis)

In the present invention, through holes having an average opening diameter of 0.1 to 30 µm and an average opening ratio of 0.05% to 10% can be easily formed by the electrochemical dissolution treatment (hereinafter, also abbreviated as a "hydrochloric acid dissolution treatment") using an electrolytic solution mainly having hydrochloric acid.

Here, from the viewpoint of easily controlling dissolution points during formation of through holes, it is preferable that the hydrochloric acid dissolution treatment is an electrolytic treatment carried out under the conditions of an average current density of 5 A/dm² or greater and an electric quantity of 50 C/dm² or greater using a direct current. Further, the average current density is preferably 100 A/dm² or less and the electric quantity is preferably 10,000 C/dm² or less.

In addition, the concentration or the temperature of the electrolytic solution in hydrochloric acid electrolysis is not particularly limited, and electrolysis at 30° C. to 60° C. may be carried out using a hydrochloric acid electrolytic solution having a high concentration, for example, a hydrochloric acid concentration of 10 to 35% by mass or electrolysis at a high temperature, for example, 80° C. or higher can be carried out using a hydrochloric acid electrolytic solution having a hydrochloric acid concentration of 0.7 to 2% by mass.

In the present invention, the average opening diameter of through holes can be adjusted to 0.1 μm or greater. Further, from the viewpoint that the opening ratio can be also adjusted to 0.1% or greater, it is preferable that an electric quantity (Q) in the electrolytic dissolution treatment and the total thickness (t) of the oxide film and the aluminum substrate during the electrolytic dissolution treatment satisfy the following Expression (1) and more preferable that the electric quantity (Q) and the total thickness (t) thereof satisfy the following Expression (2).

$$5 \leq Q/t \leq 300 \quad (1)$$

$$10 \leq Q/t \leq 300 \quad (2)$$

The reason for this is considered that elution of the oxide film and the aluminum substrate during the electrolytic dissolution treatment enters a state suitable for the thickness when the electric quantity (Q) and the total thickness (t) thereof satisfy the above-described Expression (1).

Further, in the production method of the present invention, the total thickness (t) of the oxide film and the aluminum substrate during the electrolytic dissolution treatment is basically the same value as the thickness of the aluminum substrate before the above-described oxide film forming treatment is performed.

[Oxide Film Removing Process]

An optional oxide film removing process which may be included in the method of producing an aluminum substrate is a process of removing an oxide film.

During the above-described oxide film removing process, an oxide film can be removed by performing an acid etching treatment or an alkali etching treatment described below.

<Acid Etching Treatment>

The dissolution treatment is a treatment of dissolving an oxide film using a solution (hereinafter, also referred to as an "alumina dissolving solution") that more preferentially dissolves an oxide film (aluminum oxide) than aluminum.

Here, as an alumina dissolving solution, an aqueous solution that contains at least one selected from the group consisting of a chromium compound, nitric acid, sulfuric acid, phosphoric acid, a zirconium compound, a titanium compound, a lithium salt, a cerium salt, a magnesium salt, sodium silicofluoride, zinc fluoride, a manganese compound, a molybdenum compound, a magnesium compound, a barium compound, and a halogen simple substance is preferable.

Specific examples of the chromium compound include chromium oxide (III) and chromic anhydride (VI).

Examples of the zirconium compound include zircon ammonium fluoride, zirconium fluoride, and zirconium chloride.

Examples of the titanium compound include titanium oxide and titanium sulfide.

Examples of the lithium salt include lithium fluoride and lithium chloride.

Examples of the cerium salt include cerium fluoride and cerium chloride.

Examples of the magnesium salt include magnesium sulfide.

Examples of the manganese compound include sodium permanganate and calcium permanganate.

Examples of the molybdenum compound include sodium molybdate.

Examples of the magnesium compound include magnesium fluoride pentahydrate.

Examples of the barium compound include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, and hydrates of these.

Among the barium compounds, barium oxide, barium acetate, and barium carbonate are preferable and barium oxide is particularly preferable.

Examples of the halogen simple substance include chlorine, fluorine, and bromine.

It is preferable that the above-described alumina dissolving solution is an aqueous solution containing an acid is preferable. Examples of the acid include sulfuric acid, phosphoric acid, nitric acid, and hydrochloric acid, and a mixture of two or more kinds of acids may be used.

The acid concentration is preferably 0.01 mol/L or greater, more preferably 0.05 mol/L or greater, and still more preferably 0.1 mol/L or greater. The upper limit thereof is not particularly limited, but is preferably 10 mol/L or less and more preferably 5 mol/L or less.

The dissolution treatment is performed by bringing an aluminum substrate, on which an oxide film is formed, into contact with the above-described alumina dissolving solution. A method of bringing an alumina substrate into contact with the alumina dissolving solution is not particularly limited, and examples thereof include an immersion method and a spray method. Among these, an immersion method is preferable.

The immersion method is a treatment of immersing the aluminum substrate, on which an oxide film is formed, in the above-described alumina dissolving solution. From the viewpoint that the treatment without unevenness is performed, it is preferable that stirring is performed during the immersion treatment.

The time for the immersion treatment is preferably 10 minutes or longer, more preferably 1 hour or longer, still more preferably 3 hours or longer, and particularly preferably 5 hours or longer.

<Alkali Etching Treatment>

The alkali etching treatment is a treatment of dissolving the surface layer of the oxide film by bringing the oxide film into contact with an alkali solution.

Examples of the alkali used for the alkali solution include caustic alkali and alkali metal salts. Specific examples of the caustic alkali include caustic soda and caustic potash. Examples of the alkali metal salts include alkali metal silicate such as sodium metasilicate, sodium silicate, potassium metasilicate, or potassium silicate; alkali metal carbonate such as sodium carbonate or potassium carbonate; alkali metal aluminate such as sodium aluminate or potassium aluminate; alkali metal aldonate such as sodium gluconate or potassium gluconate; and alkali metal hydrogen phosphate such as sodium secondary phosphate, potassium secondary phosphate, sodium tertiary phosphate, or potassium tertiary phosphate. Among these, from the viewpoints of a high etching speed and low cost, a caustic alkali solution or a solution containing both of caustic alkali and alkali metal aluminate is preferable and a caustic soda aqueous solution is particularly preferable.

The concentration of the alkali solution is preferably in a range of 0.1 to 50% by mass and more preferably 0.5 to 10% by mass. In a case where aluminum ions are dissolved in an alkali solution, the concentration of the aluminum ions is preferably in a range of 0.01 to 10% by mass and more preferably in a range of 0.1 to 3% by mass. The temperature of the alkali solution is preferably in a range of 10° C. to 90° C. The treatment time is preferably in a range of 1 second to 120 seconds.

Examples of the method of bringing an oxide film into contact with an alkali solution include a method of passing an aluminum substrate, on which an oxide film is formed, through a bath to which an alkali solution is added; a method of dissolving an aluminum substrate, on which an oxide film is formed in a bath to which an alkali solution is added; and a method of spraying an alkali solution to the surface (oxide film) of an aluminum substrate, on which an oxide film is formed.

[Roughening Treatment Process]

An optional roughening treatment process which may be included in the method of producing a metal support is a roughening process which is optionally performed in the method of producing a gas separation composite.

The roughening treatment process is a process of performing an electrochemical roughening treatment (hereinafter, also abbreviated as an "electrolytic roughening treatment") on the aluminum substrate from which the oxide film is removed and roughening the surface or the rear surface of the aluminum substrate.

When such an electrolytic roughening treatment is performed, the surface area ratio ΔS is set to a range of 20% to 80% and the adhesiveness to the gas separation layer is improved. Further, since the surface tension increases, it is possible to prevent permeation of a coating composition into through holes when the gas separation layer is coated with the coating composition during formation of the gas separation layer.

The electrolytic roughening treatment can be performed by appropriately employing conditions or devices described in paragraphs [0041] to [0050] of JP2012-216513A.

<Nitric Acid Electrolysis>

In the present invention, the surface area ratio ΔS can be easily set to be in a range of 20% to 80% by performing an electrochemical roughening treatment (hereinafter, also abbreviated as "nitric acid electrolysis") using an electrolytic solution that mainly includes nitric acid.

Here, from the viewpoint that uniform recesses with high density can be formed, it is preferable that the nitric acid electrolysis is an electrolytic treatment carried out using an alternating current under conditions of a peak current density of 30 A/dm$^2$ or greater, an average current density of 13 A/dm$^2$ or greater, and an electric quantity of 150 c/dm$^2$ or greater. Further, the peak current density is preferably 100 A/dm$^2$ or less, the average current density is preferably 40 A/dm$^2$ or less, and the electric quantity is preferably 400 c/dm$^2$ or less.

Moreover, the concentration or the temperature of the electrolytic solution in nitric acid electrolysis is not particularly limited, and electrolysis at 30° C. to 60° C. may be carried out using a nitric acid electrolytic solution having a high concentration, for example, a nitric acid concentration of 15 to 35% by mass or electrolysis at a high temperature, for example, 80° C. or higher can be carried out using a nitric acid electrolytic solution having a nitric acid concentration of 0.7 to 2% by mass.

<Hydrochloric Acid Electrolysis>

In the present invention, the surface area ratio ΔS can be easily set to be in a range of 20% to 80% by performing an electrochemical roughening treatment (hereinafter, also abbreviated as "hydrochloric acid electrolysis") using an electrolytic solution that mainly includes hydrochloric acid.

Here, from the viewpoint that uniform recesses with high density can be formed, it is preferable that the hydrochloric acid electrolysis is an electrolytic treatment carried out using an alternating current under conditions of a peak current density of 30 A/dm$^2$ or greater, an average current density of 13 A/dm$^2$ or greater, and an electric quantity of 150 c/dm$^2$ or greater. Further, the peak current density is preferably 100 A/dm$^2$ or less, the average current density is preferably 40 A/dm$^2$ or less, and the electric quantity is preferably 400 c/dm$^2$ or less.

[Metal Covering Process]

From the viewpoint that the average opening diameter of through holes formed by the above-described electrolytic dissolution treatment can be suitably adjusted to be in a range of 0.1 to 20 μm, which is small, it is preferable that the method of producing a metal support used for the gas separation composite of the present invention includes a metal covering process of covering at least a part or the entire surface of the aluminum substrate including the inner surfaces of the through holes with a metal other than aluminum after the above-described through hole forming process.

From the same viewpoint as described above, it is preferable that the method of producing a metal support used includes a metal covering process of covering at least a part or the entire surface of the aluminum substrate including the inner surfaces of the through holes with a metal other than aluminum after the above-described oxide film removing process.

Here, the expression "covering at least a part or the entire surface of the aluminum substrate including the inner surfaces of the through holes with a metal other than aluminum" means that at least the inner walls of the through holes in the entire surface of the aluminum substrate that includes the inner surface of the through holes are covered. The surface other than the inner walls may not be covered and a part or the entire surface may be covered.

Hereinafter, the metal covering process will be described with reference to FIGS. 4A and 4B.

Figure 4A:
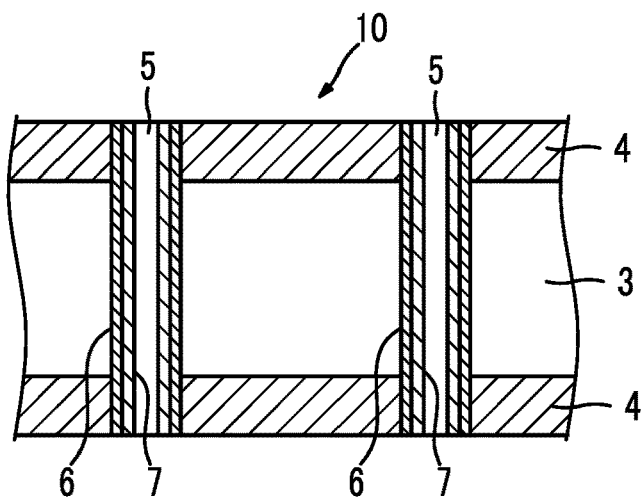
FIGS. 4A and 4B are sectional views schematically illustrating an aluminum plate prepared using a method of producing a metal support according to another embodiment.
Figure 4B:
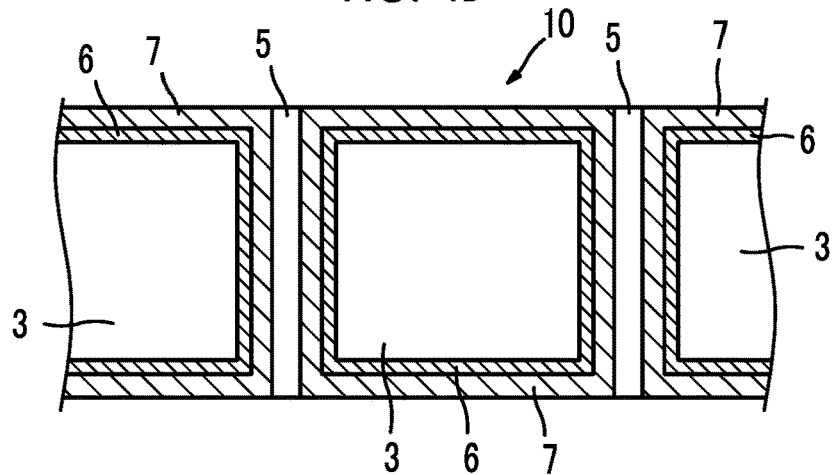

FIGS. 4A and 4B are sectional views schematically illustrating an aluminum plate prepared by a method of producing a metal support according to another embodiment.

Here, the aluminum plate 10 illustrated in FIG. 4A has a form in which inner walls of the through holes 5 have a first metal layer 6 and a second metal layer 7 formed of a metal (such as zinc, copper, or nickel) other than aluminum or an alloy and can be prepared by performing a displacement treatment and a plating treatment described below on the inner surfaces of the through holes of the aluminum substrate illustrated in FIG. 3C.

Further, the aluminum plate 10 illustrated in FIG. 4B has a form in which the surface and the rear surface of the aluminum substrate 3 having through holes and the inner walls of the through holes have the first metal layer 6 and the second metal layer 7 formed of a metal other than aluminum or an alloy and can be prepared by performing a displacement treatment and a plating treatment described below on the aluminum substrate illustrated in FIG. 2D or 3D.

<Displacement Treatment>

The displacement treatment is a treatment of displacement plating of zinc or a zinc alloy on at least a part or the entire surface of the aluminum substrate which includes inner walls of through holes.

As the displacement plating solution, a mixed solution of 120 g/L of sodium hydroxide, 20 g/L of zinc oxide, 2 g/L of crystalline ferric chloride, 50 g/L of Rochelle salts, and 1 g/L of sodium nitrate may be exemplified.

In addition, a commercially available Zn plating solution or Zn alloy plating solution may be used, and SUBSTAR Zn-1, Zn-2, Zn-3, Zn-8, Zn-10, Zn-111, Zn-222, or Zn-291 (all manufactured by OKUNO CHEMICAL INDUSTRIES CO., LTD.) can be used.

The immersion time of the aluminum substrate in such a displacement plating solution is preferably in a range of 15 seconds to 40 seconds and the immersion temperature thereof is preferably in a range of 15 seconds to 40 seconds.

<Plating Treatment>

In a case where the surface of the aluminum substrate is subjected to displacement plating of zinc or a zinc alloy to form a zinc film by performing the above-described displacement treatment, for example, it is preferable that a plating treatment in which the zinc film is displaced by nickel through electroless plating described below and then various metals are deposited by electrolytic plating described below is performed.

(Electroless Plating Treatment)

As the nickel plating solution used in the electroless plating treatment, commercially available products can be widely used, and an aqueous solution that contains 30 g/L of nickel sulfate, 20 g/L of sodium hypophosphite, and 50 g/L of ammonium citrate may be exemplified.

Further, as the nickel alloy plating solution, a Ni—P alloy plating solution in which a phosphorus compound serves as a reducing agent or a Ni—B plating solution in which a boron compound serves as a reducing agent may be exemplified.

The immersion time in such a nickel plating solution or a nickel alloy plating solution is preferably in a range of 15 seconds to 10 minutes and the immersion temperature is preferably in a range of 30° C. to 90° C.

(Electrolytic Plating Treatment)

As a plating solution in a case of electrolytic plating Cu in the electrolytic plating treatment, a plating solution obtained by adding 60 to 110 g/L of Cu sulfate, 160 to 200 g/L of sulfuric acid, and 0.1 to 0.15 mL/L of hydrochloric acid to pure water and adding 5 to 5.0 mL/L of TOP LUCINA SF BASE WR1z, 0.5 to 2.0 mL/L of TOP LUCINA SF-B, and 3.0 to 10 mL/L of TOP LUCINA SF LEVELER (manufactured by OKUNO CHEMICAL INDUSTRIES CO., LTD.) may be exemplified.

The immersion time in such a copper plating solution is not particularly limited because the time varies depending on the thickness of the Cu film. For example, in a case where a Cu fil having a thickness of 2 μm is applied, it is preferable that the immersion is carried out under the conditions of a current density of 2 A/dm$^2$ for approximately 5 minutes at an immersion temperature of 20° C. to 30° C.

[Boehmite Treatment]

From the viewpoint that the average opening diameter of through holes formed by the above-described electrolytic dissolution treatment can be suitably adjusted to be in a range of 0.1 to 20 μm, which is small, in the method of producing a metal support used for the gas separation composite of the present invention, it is preferable that a boehmite treatment is performed after the above-described through hole forming process and the above-described oxide film removing process are performed and an oxide film is formed by performing the anodic oxide treatment.

Here, the boehmite treatment is a treatment using a reaction of generating a hydrated oxide film formed of pseudo-boehimite by allowing aluminum to react with water at a high temperature or superheated steam. For example, a hydrated oxide film can be generated by adjusting the pH of water (such as pure water or deionized water) at 100° C. to 400° C. to be in a range of 7 to 12 and immersing the aluminum substrate in the water.

[Water Washing Treatment]

In the present invention, it is preferable to carry out a water washing treatment after processes of each of the above-described treatments are completed. For example, well water or tap water can be used in the water washing treatment. A nipping device may be used for the purpose of preventing the treatment liquid from being brought into the next process.

[Method of Producing Gas Separation Composite]

Next, the method of producing a gas separation composite of the present invention will be described.

According to the method of producing a gas separation composite of the present invention, the following processes are carried out in order.

(Support preparing process) A process of preparing a metal support on which predetermined through holes are formed (Coating process) A process of coating the surface of the metal support with a coating composition which becomes a gas separation layer (Separation layer forming process) A process of curing the coating composition to form a gas separation layer Hereinafter, each of the above-described processes is described in detail.

[Support Preparing Process]

The support preparing process is a process of preparing a metal support which has a plurality of through holes having an average opening diameter of 0.1 to 30 μm and an opening ratio of 0.05% to 10%. The metal support having such through holes is produced by the above-described method of producing a metal support. Further, the metal support may be a long (web-like) support or a cut sheet-like support.

As described above, it is preferable that the metal support is subjected to a roughening treatment process. The surface area ratio ΔS is adjusted to be in a range of 20% to 80% by performing a roughening treatment so that the adhesiveness to the gas separation layer is improved. Further, since the surface tension increases, it is possible to prevent permeation of the coating composition into through holes when the gas separation layer is coated with the coating composition during formation of the gas separation layer.

[Coating Process]

The coating process is a process of coating the surface of the metal support with the coating composition which becomes the gas separation layer such that the thickness of the coating composition after the curing is set to be in a range of 0.1 to 5 μm.

The coating composition may be appropriately selected according to the material of the gas separation layer. Further, the coating composition may contain a crosslinking agent, an antioxidant, a surfactant, and a solvent other than the material used for forming the gas separation layer.

For example, in a case where insoluble polyimide is used as the gas separation layer, it is preferable that the coating composition contains a polyimide compound and/or a polyimide precursor, and a solvent.

The method of coating the surface with the coating composition during the coating process is not particularly limited and various known methods can be used.

Specific examples of the coating method include a curtain flow coater, an extrusion die coater, an air doctor coater, a blade coater, a rod coater, a knife coater, a squeeze coater, a reverse roll coater, and a bar coater.

Moreover, the viscosity of the coating composition at the time of coating is not particularly limited, but is preferably in a range of 0.5 to 100 cP from the viewpoints that a thin gas separation layer can be easily formed without liquid repelling or the like and leakage of the coating composition into the through holes can be prevented.

[Separation Layer Forming Process]

The separation layer forming process is a process of curing the film of the coating composition applied to the surface of the metal support to form a gas separation layer having a thickness of 0.1 to 5 μm.

In the separation layer forming process, a drying process or a curing process is appropriately performed according to the type of the gas separation layer (coating composition) to be formed.

<Drying Process>

The drying process is a process of drying the film (coating film) of the applied coating composition and volatilizing a solvent or the like in the coating composition.

The drying process may be carried out using a known method. For example, a drying method using hot air may be exemplified.

As the wind speed of the hot air, a speed at which the coating film can be promptly dried and the coating film does not collapse may be appropriately set. Further, as the temperature of the hot air, a temperature at which deformation or the like of the metal support does not occur and the coating film can be promptly dried may be appropriately set.

<Curing Process>

The curing process is a process of curing the coating film or the dried coating film to form a gas separation layer.

A treatment during the curing process may be carried out by appropriately selecting a method that enables the curing among thermal curing, ultraviolet irradiation, electron beam irradiation, and the like according to the material for forming the gas separation layer.

Here, in a case where insoluble polyimide is used as the gas separation layer, it is preferable that the curing process is carried out by performing heating at 200° C. or higher, insolubilizing, and curing.

Further, the heat treatment temperature at the time of forming insoluble polyimide during the curing process may be appropriately adjusted according to the heat resistance of the metal support to be formed, but is preferably in a range of 200° C. to 400° C., more preferably in a range of 200° C. to 350° C., and still more preferably in a range of 220° C. to 300° C., from the viewpoints of the extent of crosslinking and the thermal decomposition temperature of polyimide.

Further, in order to sufficiently insolubilizing the polyimide compound, the time for the heat treatment is preferably 0.2 hours or longer and more preferably 0.5 hours or longer. Further, from the viewpoint of production efficiency, the time for the heat treatment is preferably 10 hours or shorter, more preferably 5 hours or shorter, and still more preferably 2 hours or shorter.

Moreover, the coating composition may be dried and heated at the same time depending on the composition of the coating composition which becomes the gas separation layer.

Further, the coating composition may be dried and/or cured in an inert atmosphere such as a nitrogen atmosphere as needed.

EXAMPLES

Hereinafter, the present invention will be described in detail with reference to the following examples. The materials, the use amounts, the ratios, the treatment contents, and the treatment procedures shown in the following examples can be appropriately changed within the range not departing from the gist of the present invention. Therefore, the scope of the present invention should not be limitatively interpreted by the following examples.

Example 1

<Preparation of Metal Support>

A treatment described below was performed on the surface of an aluminum substrate (JIS H-4160, alloy No. 1N30-H, aluminum purity: 99.30%) having a thickness of 12 μm and a width of 200 mm, thereby preparing an aluminum substrate (metal support).

(a1) Oxide Film Forming Treatment (Oxide Film Forming Process)

15 V of a DC voltage was applied to the aluminum substrate using the aluminum substrate as an anode under the conditions of 52° C. and a direct current density of 25 A/dm$^2$ for 16 seconds with a solution having a sulfuric acid concentration of 170 g/L and an aluminum concentration of 5% or less, thereby forming an oxide film (coating film amount: 2.4 g/m$^2$). Thereafter, the oxide film was washed with water by spraying water.

(b1) Electrolytic Dissolution Treatment (Through Hole Forming Process)

Next, an electrolytic treatment was performed using the aluminum substrate as an anode under the condition of a total electric quantity of 100 C/dm$^2$ with an electrolytic solution whose temperature was maintained at 50° C. (nitric acid concentration: 1% and aluminum concentration: 4.5 g/L), thereby forming through holes in the aluminum substrate and the oxide film. Moreover, the electrolytic treatment was performed using a DC power source. The current density was set to 25 A/dm2.

Thereafter, the through holes were washed with water by spraying water and dried, thereby preparing an aluminum substrate with through holes having an average opening diameter of 1.0 μm.

(c1) Oxide Film Removing Treatment (Oxide Film Removing Process)

Next, the oxide film was dissolved and removed by immersing the aluminum substrate after the electrolytic dissolution treatment in an aqueous solution (liquid temperature: 35° C.) having a caustic soda concentration of 5% by mass for 10 seconds and an aluminum ion concentration of 0.5% by mass.

Subsequently, the aluminum substrate was washed with water by spraying water and dried.

(c2) Oxide Film Removing Treatment (Desmutting Process)

Further, smut was dissolved and removed by immersing the aluminum substrate in a sulfuric acid aqueous solution (sulfuric acid concentration: 300 g/L and liquid temperature: 60° C.) for 120 seconds.

Thereafter, the aluminum substrate was washed with water by spraying water and dried.

(d1) Metal Covering Treatment (Metal Covering Process)

Next, a displacement treatment, a plating treatment, and an electrolytic plating treatment were performed as the metal covering treatment.

(Displacement Treatment)

A zincate treatment was performed by immersing the aluminum substrate in SUBSTAR ZN-111 (manufactured by OKUNO CHEMICAL INDUSTRIES CO., LTD.) whose temperature was adjusted to 25° C. for 1 minute. Next, the zincate film was removed by immersing the substrate in a nitric acid aqueous solution, and then the substrate was immersed in SUBSTAR ZN-111 whose temperature was adjusted to 25° C. for 1 minute again.

(Plating Treatment)

The aluminum substrate was immersed in a boron-based Ni—B plating solution whose temperature was adjusted to 50° C. for 90 seconds, thereby forming a nickel layer having a thickness of 0.02 µm.

(Electrolytic Plating Treatment)

An electrolytic treatment was performed in a Cu sulfate plating solution whose temperature was adjusted to 25° C. under the condition of a total electric quantity of 300° C./dm$^2$ using the aluminum substrate as a cathode, and a Cu layer was formed such that the average opening diameter of through holes was set to 0.1 µm, thereby preparing an aluminum support.

When the average opening diameter and the opening ratio of through holes of the prepared aluminum support were measured according to the following method, the average opening diameter was 0.1 µm and the opening ratio was 0.05%.

The average opening diameter of the through holes was acquired by imaging the surface of the metal support from right above at a magnification of 200 using a high-resolution scanning electron microscope (SEM), extracting at least 20 pits (irregularities) having a medium wave structure, in which the surroundings were continued in a circular form, in the obtained SEM photograph, reading the diameters to obtain opening diameters thereof, and then calculating the average value of the opening diameters to obtain the average opening diameter.

Further, the opening ratio of the through holes was acquired by imaging the surface of the metal support from right above at a magnification of 200 using a high-resolution scanning electron microscope (SEM), binarizing the visual fields (five sites) at a size of 30 mm×30 mm in the obtained SEM photograph using image analysis software, observing through hole portions and non-through hole portions, obtaining a ratio (opening area/geometric area) from the total opening area of through holes and the area of visual fields (geometric area), and calculating the average value of respective visual fields (five portions), thereby obtaining an opening ratio.

<Preparation of Gas Separation Composite>

A gas separation composite was prepared by coating the surface of the prepared aluminum support with the coating composition described below and/or curing the coating composition.

(Preparation of Coating Composition)

123 mL of N-methylpyrrolidone (manufactured by Tokyo Chemical Industry Co., Ltd., product number: M0418) and 54.97 g (0.124 mol) of 6FDA (manufactured by Tokyo Chemical Industry Co., Ltd., product number: H1438) were added to a three-necked flask, dissolved therein at 40° C., and stirred in a nitrogen stream. A solution obtained by dissolving 3.056 g (0.0186 mol) of 2,3,5,6-tetramethylphenylenediamine (manufactured by Tokyo Chemical Industry Co., Ltd., product number: T1457) and 16.04 g (0.1055 mol) of 3,5-diaminobenzoic acid (DABA) (manufactured by Tokyo Chemical Industry Co., Ltd., product number: D0294) in 84.0 mL of N-methylpyrrolidone was added dropwise to the above-described solution for 30 minutes while the temperature in the system was maintained at 40° C. After the reaction solution was stirred at 40° C. for 2.5 hours, 2.94 g (0.037 mol) of pyridine (manufactured by Tokyo Chemical Industry Co., Ltd., product number: Q0034) and 31.58 g (0.31 mol) of acetic anhydride (manufactured by Wako Pure Chemical Industries, Ltd., product number: 018-00286) were respectively added to the reaction solution, and the solution was further stirred at 80° C. for 3 hours. Subsequently, 676.6 mL of acetone was added to the reaction solution so that the solution was diluted. An acetone diluent of the reaction solution was added dropwise to a solution obtained by adding 1.15 L of methanol and 230 mL of acetone to a stainless steel container and stirring the mixture. The obtained polymer crystals were suctioned and filtered and then blast dried at 60° C., thereby obtaining 51.3 g of polyimide (P-01, weight average molecular weight: 112,000).

4 g of polyimide (P-01), 44 g of methyl ethyl ketone (manufactured by Wako Pure Chemical Industries, Ltd., product number: 024-15635), and 2.4 g of methyl isobutyl ketone (manufactured by Wako Pure Chemical Industries, Ltd., product number: 139-02086) were mixed with each other in a brown vial bottle and then stirred for 60 minutes, thereby preparing a coating composition.

(Formation of Gas Separation Layer)

The aluminum support was coated with the obtained coating composition and dried at 70° C. for 2 hours using a blast-drier. Thereafter, the aluminum support was subjected to a heat treatment at 250° C. for 1 hour using an inert oven (manufactured by IKEDA SCIENTIFIC Co., Ltd., STPH-201H) so that the film was insolubilized, and insoluble polyimide was formed as a gas separation layer. The thickness of the gas separation layer was 0.1 µm.

Examples 2 and 3

Gas separation composites were prepared by preparing aluminum supports using the same method as in Example 1 except that the total electric quantity and the current density which were the treatment conditions of the above-described (b1) electrolytic dissolution treatment were changed into values listed in the following Table 1 and the sizes of through holes to be formed were changed into values listed in the following Table 2 without performing the above-described (d1) metal covering treatment.

Examples 4 to 6

Gas separation composites were prepared in the same manner as in Example 1 except that the total electric quantity and the current density which were the treatment conditions of the above-described (b1) electrolytic dissolution treatment were changed into values listed in the following Table 1, the sizes of through holes to be formed were changed into values listed in the following Table 2 to prepare aluminum supports without performing the above-described (d1) metal covering treatment, and the thicknesses of the gas separation layers to be formed on the aluminum substrates were changed into values listed in the following Table 2.

Comparative Examples 1 to 4

Gas separation composites were prepared by preparing aluminum supports using the same method as in Example 1 except that the total electric quantity and the current density which were the treatment conditions of the above-described (b1) electrolytic dissolution treatment were changed into values listed in the following Table 1, the sizes of through holes to be formed were changed into values listed in the following Table 7 to prepare aluminum supports without performing the above-described (d1) metal covering treatment, and the thicknesses of the gas separation layers to be formed on the aluminum substrates were changed into values listed in the following Table 2.

Example 7

A gas separation composite was prepared by preparing an aluminum support using the same method as in Example 4 except that the (e1) electrolytic roughening treatment described below was performed after the above-described (c2) oxide film removing treatment.

(e1) Electrolytic Roughening Treatment

Figure 5:
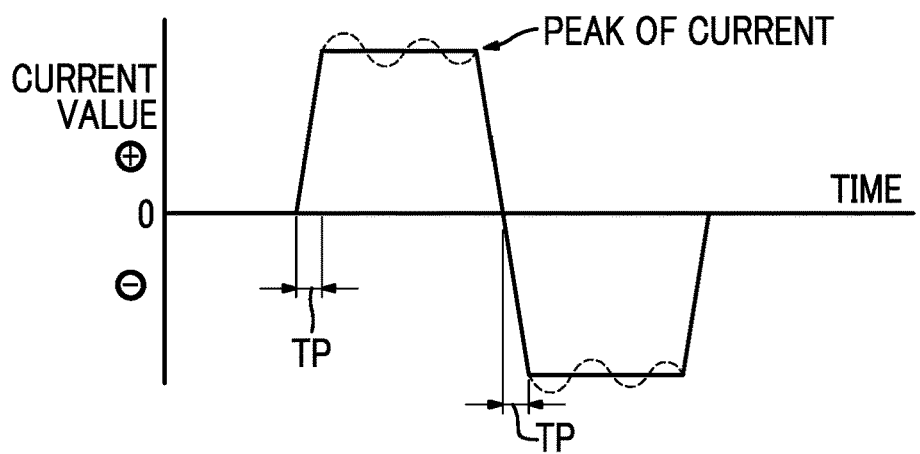
FIG. 5 is a graph showing an example of an alternating current waveform used for an optional electrochemical roughening treatment in the method of producing a metal support.
Figure 6:
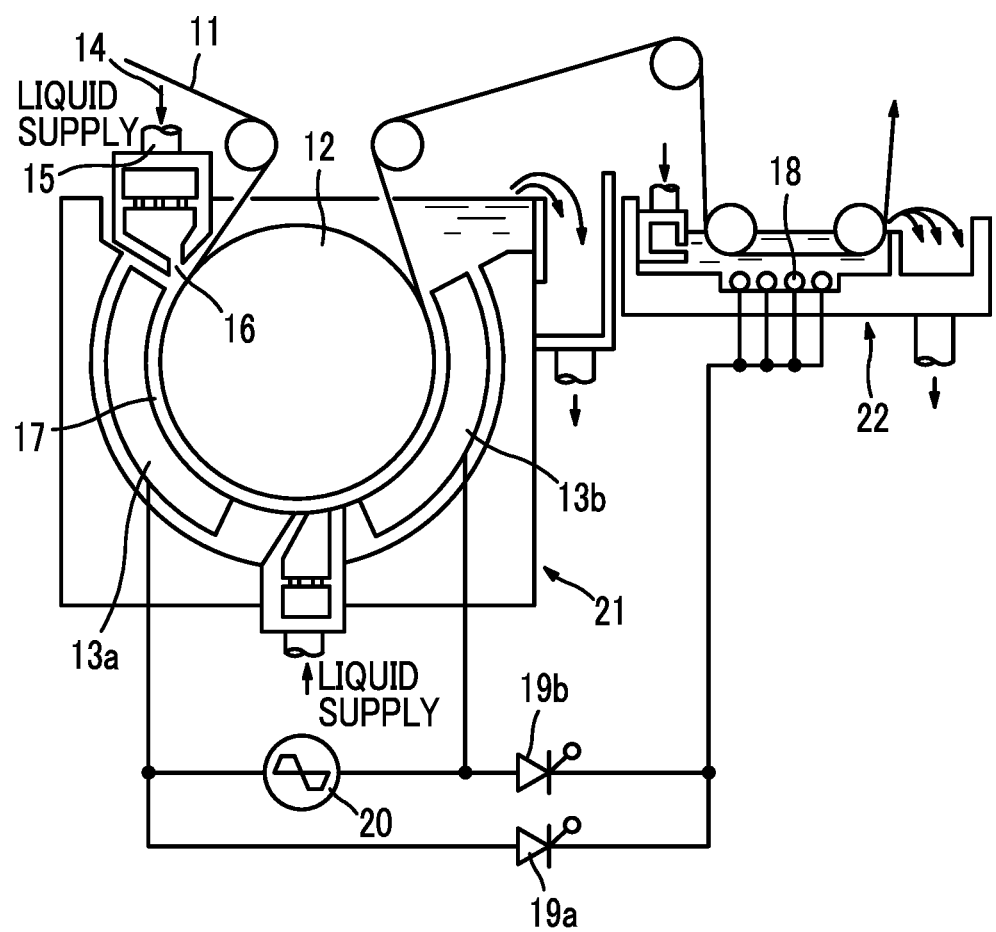
FIG. 6 is a view schematically illustrating an example of a radial type cell in the electrochemical roughening treatment using an alternating current.

Next, an electrochemical roughening treatment was continuously performed on the aluminum substrate after the oxide film removing treatment using 60 Hz of an AC voltage. An electrolytic solution at this time was an aqueous solution (containing 4.5 g/L of aluminum ions) containing 10 g/L nitric acid at a temperature of 50° C. The AC power source waveform was a waveform illustrated in FIG. 5, and the electrochemical roughening treatment was performed under the conditions of a time TP of 0.8 msec, which was taken for the current value to reach the peak from zero, and a duty ratio of 1:1 with a trapezoidal rectangular wave AC using a carbon electrode as a counter electrode. Ferrite was used as an auxiliary anode. A bath illustrated in FIG. 6 was used as an electrolytic bath. The peak value of the current had a current density of 50 A/dm$^2$, and the average value of the current density was 22.6 A/dm2. Further, the total electric quantity at the time of using aluminum foil as an anode was 250 C/dm$^2$. Subsequently, the aluminum substrate was washed with water by spraying water.

The surface area ratio ΔS of the surface of the aluminum support after the roughening treatment was 20%.

Example 8

A gas separation composite was prepared by preparing an aluminum support using the same method as in Example 7 except that the treatment conditions of the above-described (e1) electrolytic roughening treatment were changed so that the total electric quantity was changed into 185 C/dm$^2$ and the surface area ratio ΔS of the aluminum support was changed into 60%.

Example 9

A gas separation composite was prepared by preparing an aluminum support using the same method as in Example 7 except that the treatment conditions of the above-described (e1) electrolytic roughening treatment were changed so that the total electric quantity was changed into 185 C/dm$^2$ and the surface area ratio ΔS of the aluminum support was changed into 80%.

[Evaluation]

The presence or absence of liquid leakage, the pressure resistance, and the gas permeability of the gas separation composites prepared in Examples 1 to 6 and Comparative Examples 1 to 4 were evaluated.

<Liquid Leakage Test>

The surfaces and the rear surfaces of the prepared gas separation composites were observed using an SEM, and the presence or absence of liquid leakage was evaluated. A gas separation composite in which a gas separation layer was not formed at the positions of through holes and a gas separation composite in which a gas separation layer was not formed in through holes were evaluated as the gas separation composites with liquid leakage.

An area having a dimension of 0.5×0.5 mm was observed and the presence or absence of liquid leakage was evaluated.

<Pressure Resistance Test>

Permeation test samples were prepared by cutting the prepared gas separation composites such that the diameter of each membrane became 47 mm. Using a gas permeability measurement device manufactured by GTR Tec Corporation, mixed gas in which the volume ratio of carbon dioxide ($CO_2$) to methane ($CH_4$) was 20:80 (volume ratio) was adjusted and supplied such that the total pressure on the gas supply side became 5 MPa (partial pressure of $CO_2$: 1 MPa), the flow rate thereof became 500 mL/min, and the temperature thereof became 40° C. Thereafter, the surfaces and the rear surfaces of the gas separation composites were observed using an SEM, and the presence or absence of breakage (damage) of the gas separation layers was evaluated.

An area having a dimension of 0.5×0.5 mm was observed and the number of sites at which breakage occurred was measured.

A: The breakage was not found.
B: Several sites with breakage were found.
C: Plural sites with breakage were found.

<Gas Permeability Test>

Permeation test samples were prepared by cutting the prepared gas separation membranes such that the diameter of each membrane became 47 mm. Using a gas permeability measurement device manufactured by GTR Tec Corporation, mixed gas in which the volume ratio of carbon dioxide ($CO_2$) to methane ($CH_4$) was 20:80 (volume ratio) was adjusted and supplied such that the total pressure on the gas supply side became 5 MPa (partial pressure of $CO_2$: 1 MPa), the flow rate thereof became 500 mL/min, and the temperature thereof became 40° C. The gas that had been passed through was analyzed using gas chromatography. The gas permeabilities of the gas separation membranes were compared to each other by calculating gas permeation rates as gas permeability (Permeance).

A: The gas permeation rate was 5 GPU or greater
B: The gas permeation rate was in a range of 0.1 GPU to less than 5 GPU
C: The gas permeating rate was less than 0.1 GPU.

Moreover, since plural sites were found in the liquid leakage tests of Comparative Examples 1 and 3, the gas permeability test was not able to be performed.

Further, since damage to the gas separation layer was found in the gas permeability test of Comparative Example 2, proper evaluation was not able to be performed.

The results were listed in Table 2.

TABLE 1

| | (b1) Electrolytic dissolution treatment | |
|---|---|---|
| | Total electric quantity C/dm$^2$ | Current density A/dm$^2$ |
| Example 1 | 100 | 25 |
| Example 2 | 300 | 25 |

TABLE 1-continued

|  | (b1) Electrolytic dissolution treatment | |
|---|---|---|
|  | Total electric quantity C/dm² | Current density A/dm² |
| Example 3 | 500 | 25 |
| Example 4 | 1000 | 20 |
| Example 5 | 1000 | 20 |
| Example 6 | 1000 | 20 |
| Comparative Example 1 | 400 | 10 |
| Comparative Example 2 | 800 | 25 |
| Comparative Example 3 | 1000 | 20 |
| Comparative Example 4 | 500 | 25 |

TABLE 2

|  | Metal support | | Thickness | | Evaluation | | |
|---|---|---|---|---|---|---|---|
|  | Through holes | | | | | | |
|  | Opening diameter X μm | Opening ratio % | T of gas separation layer μm | X/T | Liquid leakage | Pressure resistance | Permeability |
| Example 1 | 0.1 | 0.05 | 0.1 | 1 | Absent | A | A |
| Example 2 | 5 | 1 | 0.1 | 50 | Absent | A | A |
| Example 3 | 10 | 10 | 0.1 | 100 | Absent | A | A |
| Example 4 | 30 | 10 | 1 | 30 | Absent | A | A |
| Example 5 | 30 | 10 | 5 | 6 | Absent | A | A |
| Example 6 | 30 | 10 | 0.1 | 300 | Absent | B | A |
| Comparative Example 1 | 50 | 1 | 1 | 50 | Present | — | — |
| Comparative Example 2 | 10 | 20 | 1 | 10 | Absent | C | — |
| Comparative Example 3 | 35 | 10 | 0.1 | 350 | Present | — | — |
| Comparative Example 4 | 10 | 10 | 15 | 0.67 | Absent | A | C |

Next, the adhesiveness of the gas separation composites prepared in Examples 4 and 7 to 9 was evaluated.

<Adhesiveness Test>

The surfaces of the gas separation layers of the prepared gas separation composites were notched in a grid form using a cutter knife to make longitudinally 11 lines and laterally 11 lines, and 100 squares in total were cut, and then ester adhesive tape (No. 31B, manufactured by NITTO DENKO CORPORATION) was adhered to the surface. The tape was peeled off in the vertical direction after 30 minutes and the number of peeled squares was counted. The same test was repeated three times, the average of the obtained numbers was calculated, and the adhesiveness was evaluated based on the following criterial AA: No squares were peeled off.
A: 1 to 5 squares were peeled off.
B: 6 to 10 squares were peeled off.
C: 11 or more squares were peeled off.

The results are listed in Table 3.

TABLE 3

|  | Metal support | | | Thickness | | Evaluation |
|---|---|---|---|---|---|---|
|  | Through holes | | | | | |
|  | Opening diameter X μm | Opening ratio % | ΔS % | T of gas separation layer μm | X/T | Adhesiveness |
| Example 4 | 30 | 10 | 1 | 1 | 30 | B |
| Example 7 | 30 | 10 | 20 | 1 | 30 | A |
| Example 8 | 30 | 10 | 60 | 1 | 30 | AA |
| Example 9 | 30 | 10 | 80 | 1 | 30 | AA |

As listed in Table 2, it was understood that liquid leakage did not occur even when gas separation composites were heated during formation of gas separation layers, the pressure resistance was excellent, and the gas separation layers were able to be properly supported in the gas separation composites of Examples 1 to 6 of the present invention in which the thickness of each gas separation layer is in a range of 0.1 to 5 μm, the average opening diameter of through holes to be formed on a metal support is in a range of 0.1 to 30 μm, and the opening ratio of through holes is in a range of 0.05% to 10%. Therefore, it was understood that the gas separation composites had excellent gas separation properties and excellent gas permeability.

On the contrary, the gas separation layers were damaged during formation of gas separation layers or the gas separation operation in the gas separation composites of Comparative Examples 1 to 3. Accordingly, the gas separation was not able to be properly performed. Further, in the gas separation composite of Comparative Example 4, since the gas separation layer was formed in through holes, the gas permeability was degraded and the gas separation was not able to be properly performed.

Moreover, when Examples 3 to 5 and 6 were compared with each other, from the viewpoint of pressure resistance, it is understood that the ratio X/T of the average opening diameter X of through holes to the thickness T of a gas separation layer is preferably in a range of 0.02 to 100.

Further, as listed in Table 3, from the viewpoint of adhesiveness, it is understood that the surface area ratio ΔS of a metal support is preferably in a range of 20% to 80% and more preferably in a range of 60% to 80%.

From the results described above, the effects of the present invention are apparent.

EXPLANATION OF REFERENCES

1: aluminum substrate
2: oxide film
3: aluminum substrate having through holes
4: oxide film having through holes
5: through holes
6: first metal layer
7: second metal layer
10: metal support
11: aluminum substrate
12: radial drum roller
13a, 13b: main pole
14: electrolytic treatment liquid
15: electrolytic solution supply port
16: slit
17: electrolytic solution passage
18: auxiliary anode
19a, 19b: thyristor
20: AC power source
21: main electrolytic bath
22: auxiliary anode bath
100: gas separation composite
102: gas separation layer

What is claimed is:

1. A gas separation composite comprising:
a metal support which has a plurality of through holes in a thickness direction; and
a gas separation layer which is laminated on a surface of the metal support,
wherein a thickness of the gas separation layer is in a range of 0.1 to 5 μm,
an average opening diameter of the through holes of the metal support is in a range of 0.1 to 30 μm, and
an opening ratio of the metal support is in a range of 0.05% to 10%.

2. The gas separation composite according to claim 1, wherein the metal support is an aluminum substrate.

3. The gas separation composite according to claim 1, wherein the material of the gas separation layer is insoluble polyimide.

4. The gas separation composite according to claim 2, wherein the material of the gas separation layer is insoluble polyimide.

5. The gas separation composite according to claim 1, wherein a ratio X/T of the average opening diameter X of the through holes to the thickness T of the gas separation layer is in a range of 0.02 to 100.

6. The gas separation composite according to claim 4, wherein a ratio X/T of the average opening diameter X of the through holes to the thickness T of the gas separation layer is in a range of 0.02 to 100.

7. The gas separation composite according to claim 1, wherein a surface area ratio ΔS at the interface between the metal support and the gas separation layer is in a range of 20% to 80%.

8. The gas separation composite according to claim 6, wherein a surface area ratio ΔS at the interface between the metal support and the gas separation layer is in a range of 20% to 80 %.

9. The gas separation composite according to claim 1, wherein a thickness of the metal support is in a range of 5 to 100 μm.

10. The gas separation composite according to claim 8, wherein a thickness of the metal support is in a range of 5 to 100 μm.

11. A method of producing a gas separation composite comprising:
a preparing process of preparing a metal support which has a plurality of through holes in a thickness direction and in which an average opening diameter of the through holes is in a range of 0.1 to 30 82 m and an opening ratio thereof is in a range of 0.05% to 10%;
a coating process of coating the surface of the metal support with a coating composition which becomes a gas separation layer; and
a separation layer forming process of curing the coating composition applied to the surface of the metal support to form the gas separation layer having a thickness of 0.1 to 5 μm.

12. The method of producing a gas separation composite according to claim 11,
wherein the gas separation layer is insoluble polyimide, and
the separation layer forming process includes a process of heating the applied coating composition at 200° C. or higher for insolubilization.

13. The method of producing a gas separation composite according to claim 11,
wherein the metal support is an aluminum substrate, and
the preparing process includes an oxide film forming process of performing an oxide film forming treatment on the surface of the aluminum substrate to form an oxide film, and a through hole forming process of performing an electrochemical dissolution treatment after the oxide film forming process to form the through holes.

14. The method of producing a gas separation composite according to claim 12,
wherein the metal support is an aluminum substrate, and
the preparing process includes an oxide film forming process of performing an oxide film forming treatment on the surface of the aluminum substrate to form an oxide film, and a through hole forming process of performing an electrochemical dissolution treatment after the oxide film forming process to form the through holes.

15. The method of producing a gas separation composite according to claim 13,
wherein the preparing process further includes an oxide film removing process of removing the oxide film after the through hole forming process.

16. The method of producing a gas separation composite according to claim 14,
wherein the preparing process further includes an oxide film removing process of removing the oxide film after the through hole forming process.

17. The method of producing a gas separation composite according to claim 13,
wherein the preparing process further includes a metal covering process of covering at least a part or the entire surface of the aluminum substrate including inner surfaces of the through holes with a metal other than aluminum after the through hole forming process.

18. The method of producing a gas separation composite according to claim 16,
wherein the preparing process further includes a metal covering process of covering at least a part or the entire surface of the aluminum substrate including inner surfaces of the through holes with a metal other than aluminum after the through hole forming process.

19. The method of producing a gas separation composite according claim 11, further comprising:
a roughening process of roughening a surface of a metal support side on which the gas separation layer is formed and setting a surface area ratio ΔS thereof to be in a range of 20% to 80% after the preparing process and before the coating process.

20. The method of producing a gas separation composite according to claim 18, further comprising:
a roughening process of roughening a surface of a metal support side on which the gas separation layer is formed and setting a surface area ratio ΔS thereof to be in a range of 20 % to 80 % after the preparing process and before the coating process.

* * * * *